United States Patent
Nystad et al.

(10) Patent No.: US 9,659,401 B2
(45) Date of Patent: May 23, 2017

(54) METHODS OF AND APPARATUS FOR USING TEXTURES IN GRAPHICS PROCESSING SYSTEMS

(71) Applicant: ARM Limited, Cambridge (GB)

(72) Inventors: Jorn Nystad, Trondheim (NO); Andreas Engh-Halstvedt, Trondheim (NO); Edvard Sorgard, Hundhamaren (NO); Thomas Jeremy Olson, San Jose, CA (US); Marius Bjorge, Trondheim (NO)

(73) Assignee: ARM LIMITED, Cambridge (GB)

( * ) Notice: Subject to any disclaimer, the term of this patent is extended or adjusted under 35 U.S.C. 154(b) by 81 days.

(21) Appl. No.: 13/690,159

(22) Filed: Nov. 30, 2012

(65) Prior Publication Data

US 2014/0152684 A1    Jun. 5, 2014

(51) Int. Cl.
  *G06T 15/04* (2011.01)
  *G06T 11/40* (2006.01)
(52) U.S. Cl.
  CPC .............. *G06T 15/04* (2013.01); *G06T 11/40* (2013.01)
(58) Field of Classification Search
  CPC ..... G06T 15/04; G06T 15/503; G06T 11/001; G06T 2210/36; G06T 2210/62; G09G 2340/10; G09G 5/377; G06F 12/1009
  See application file for complete search history.

(56) References Cited

U.S. PATENT DOCUMENTS

| | | | |
|---|---|---|---|
| 5,740,343 A * | 4/1998 | Tarolli et al. | 345/587 |
| 6,292,191 B1 | 9/2001 | Vaswani et al. | |
| 6,373,482 B1 | 4/2002 | Migdel et al. | |
| 7,710,424 B1 | 5/2010 | Hutchins et al. | |
| 2006/0250408 A1 | 11/2006 | Xu | |
| 2008/0106552 A1 | 5/2008 | Everitt | |
| 2008/0303841 A1 | 12/2008 | Newhall, Jr. | |
| 2011/0148894 A1 | 6/2011 | Duprat et al. | |
| 2011/0157206 A1 | 6/2011 | Duluk et al. | |
| 2012/0038657 A1 | 2/2012 | Grossman et al. | |

(Continued)

OTHER PUBLICATIONS

Bllodeau, et al., "Partially Resident Textures on Next-Generation GPUs," AMD, Mar. 8, 2012.

(Continued)

*Primary Examiner* — Antonio A Caschera
(74) *Attorney, Agent, or Firm* — Vierra Magen Marcus LLP

(57) ABSTRACT

A graphics virtual texturing system in which textures stored in a storage medium of a host system are divided into respective pages that are then loaded into a local memory of a graphics processing system for use. Each page of a graphics texture has an associated fade factor value that can be set by an application that is to use the texture to control the contribution that the page will be used to make to any texturing result that is generated using the texture page in question. The graphics processing system then controls the contribution of texture data from a texture page to texturing result data to be generated in accordance with the fade factor value associated with the texture page in question. This allows texture paging to be done in a more visually pleasing manner than just a binary "page-is-here"/"page-is-not-here" switch.

22 Claims, 8 Drawing Sheets

(56) References Cited

U.S. PATENT DOCUMENTS

2012/0147028 A1    6/2012  Frisinger

OTHER PUBLICATIONS

Nvidia Corporation, "The bindless texture," Mar. 21, 2012.
SGIX, "Clipmap," Jun. 12, 1996.
van Waveren, "id Tech 5 Challenges—From Texture Virtualization to Massive Parallelization," SIGGRAPH'09, New Orleans, 2009.
U.S. Appl. No. 13/690,151, filed Nov. 30, 2012.
Office Action dated May 23, 2014 in UK Patent Application No. GB1321048.9, Combined Search and Examination Report, 6 pages.
Office Action dated Feb. 4, 2015 in U.S. Appl. No. 13/690,151, 25 pages.
Combined Search and Examination Report dated Jun. 5, 2014 in UK Patent Application No. GB13210463, 9 pages.
Office Action dated Jun. 9, 2015, in GB Patent Application No. GB1321046.3.
Response to Office Action dated Jul. 4, 2015, in U.S. Appl. No. 13/690,151, filed Nov. 30, 2012.
Final Office Action dated Aug. 11, 2015, in U.S. Appl. No. 13/690,151, filed Nov. 30, 2012.
Response to Office Action dated Dec. 11, 2015 in U.S. Appl. No. 13/690,151, filed Nov. 30, 2012.
Notice of Allowance dated Jan. 29, 2016 in U.S. Appl. No. 13/690,151, filed Nov. 30, 2012.

* cited by examiner

| Page address / MipMap Skip | Fade Factor | Access | Valid |
|---|---|---|---|
| 31 | 32 | 33 | 34 |

FIG. 3A

| MipMap Skip | Unused | Access | 0 |
|---|---|---|---|
| 31 | 32 | 33 | 34 |

FIG. 3B

| Page address | Fade Factor | Access | 1 |
|---|---|---|---|
| 31 | 32 | 33 | 34 |

FIG. 3C

METHODS OF AND APPARATUS FOR USING TEXTURES IN GRAPHICS PROCESSING SYSTEMS

BACKGROUND

The technology described herein relates to methods of and apparatus for using and handling textures, and in particular for carrying out so-called "virtual texturing", in computer graphics systems.

It is common in computer graphics systems to generate colors for sampling positions in an image to be displayed by applying so-called textures or texture data to the surfaces to be drawn. For example, surface detail on objects may be generated by applying a predefined "texture" to a set of graphics primitives (such as polygons) representing the object, to give the rendered image of the object the appearance of the "texture". Such textures are typically applied by storing an array of texture elements or "texels", each representing given texture data (such as color, luminance, and/or light/shadow, etc., values) at a given location (position), and then mapping the texels onto the corresponding elements, such as (and, indeed, typically) a set of sampling positions, for the image to be displayed. The stored arrays of texture elements (data) are typically referred to as "texture maps".

Some graphics texture mapping arrangements use so-called "virtual texturing". In virtual texturing, a single very large texture is stored in some form of external memory (such as on a removable storage media, or the host computer's hard drive), and then parts of that large texture are loaded as needed into the local memory, e.g. RAM, of the graphics processing system for use. This allows a single larger texture map to be used for the texture in question, but without the need to store the entire large texture in the local memory of the graphics processing system in use.

Virtual texturing is used, for example, to allow the use of a single large texture for static terrain (e.g. in games), rather than having to repeat multiple smaller textures. Virtual texturing can allow large amounts of detail and variation over a large area to be included in a single texture, but without the need to fill the graphics processing system's local memory with all of the texture map at the same time. As the player, e.g., moves around in the game, different portions of the texture map are loaded into the graphics processor's local memory and used to display the appropriate terrain for the player's current game position.

Virtual texturing is also used for so-called texture "atlases", where multiple smaller textures are packed into a single larger texture map.

Other terms for virtual texturing include "mega textures" and "partially resident textures". It is also known to perform so-called "sparse texturing". This is similar to "virtual texturing" in that the whole texture need not be present in the local memory of the graphics processing system, but unlike in virtual texturing, in sparse texturing there is no system for handling texture accesses outside the texture data that is present in the local memory. The term "virtual texturing" will be used herein for convenience, but it should be understood that the technology described herein is applicable to all these (and any other) forms of texturing used in graphics processing systems where only limited parts of a larger overall texture are kept in the local memory of the graphics processing system at any given time.

In virtual texturing, the parts that the large texture is divided into for the purposes of loading it into the local memory of the graphics processing system are typically referred to as "pages", although other terms, such as "tiles", may be used. For convenience, the term "pages" will primarily be used herein to refer to the respective different parts that the large texture is divided into for the purposes of loading it into the local memory of the graphics processing system for virtual texturing purposes. However, it should be understood that such references to "pages" simply refers to the respective sub-regions or parts that the overall texture is divided into for the purposes of loading it into the local memory of the graphics processing system, and so includes any equivalent terms.

BRIEF DESCRIPTION OF THE DRAWINGS

A number of embodiments of the technology described herein will now be described by way of example only and with reference to the accompanying drawings, in which:

FIGS. 3A, 3B and 3C show schematically the page table entries used in the described embodiment of the technology described herein;

Like numerals are used for like features in the drawings (where appropriate).

DETAILED DESCRIPTION

Figure 1:
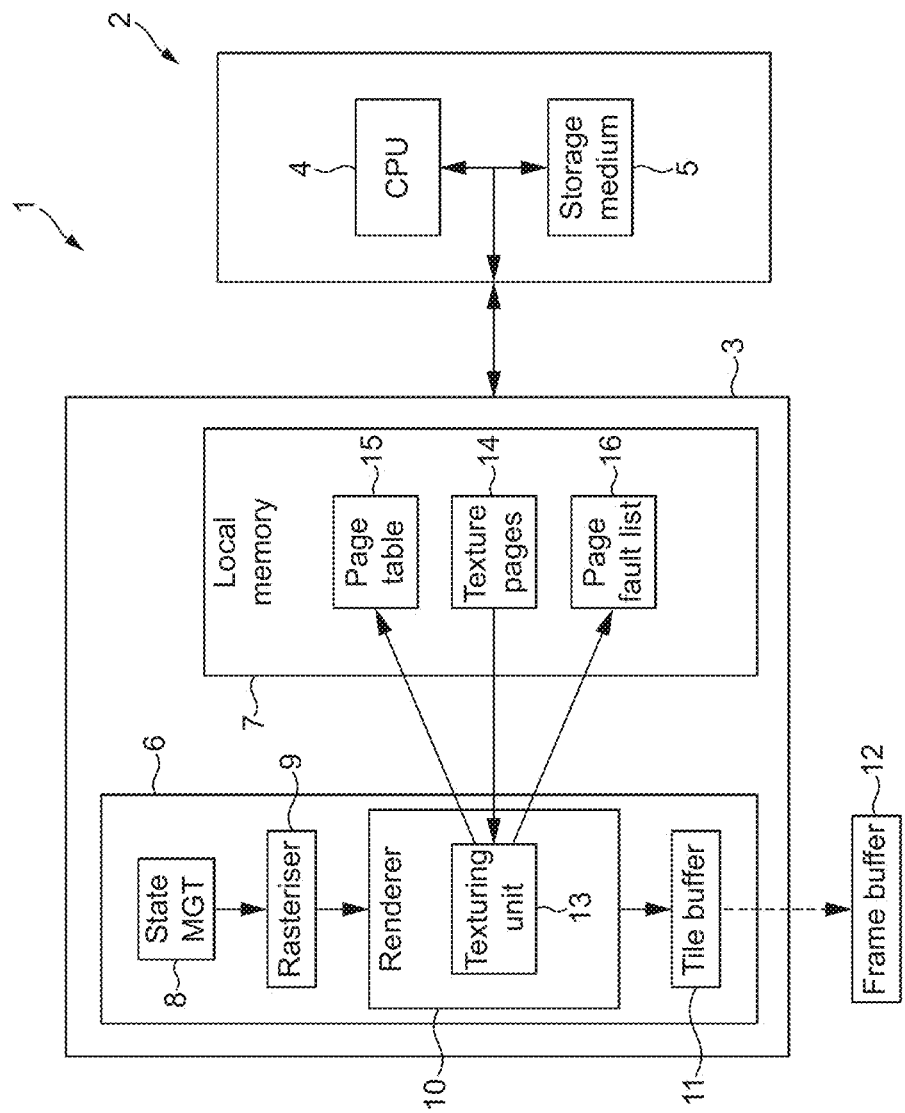
FIG. 1 shows schematically an embodiment of a data processing system that may be operated in the manner of the technology described herein.

A first embodiment of the technology described herein, comprises a method of configuring a texture for use in a graphics processing system, the method comprising:
  associating respective sub-regions within a graphics texture to be used by a graphics processing system with respective fade factor values that can be set by an application that is to use the texture to control the contribution that the sub-region will be used to make to any texturing result that is generated using the sub-region in question.

Another embodiment of the technology described herein, comprises a graphics processing system, comprising:
  a graphics processing unit that can use graphics textures to generate texturing result data for use when generating rendering output data to be generated by the graphics processing unit; and
  processing circuitry configured to associate respective sub-regions within a graphics texture to be used by the graphics processing unit to generate texturing result data with respective fade factor values that can be set by an application that is to use the texture to control the contribution that the sub-region will be used to make to any texturing result that is generated using the sub-region in question.

Another embodiment of the technology described herein, comprises a method of using a graphics texture to generate texturing result data in a graphics processing system in which respective sub-regions within a graphics texture to be used by a graphics processing system can be associated with respective fade factor values that can be set by an application that is to use the texture, the method comprising:

the graphics processing system, when using a sub-region of a texture that has an associated fade factor value to generate texturing result data, controlling the contribution of texture data from the sub-region to the generated texturing result data in accordance with the fade factor value associated with the sub-region.

Another embodiment of the technology described herein, comprises a graphics processing system, comprising:

a graphics processing unit that can use graphics textures to generate texturing result data for use when generating rendering output data to be generated by the graphics processing unit; and processing circuitry configured to associate respective sub-regions within a graphics texture to be used by the graphics processing unit to generate texturing result data with respective fade factor values that can be set by an application that is to use the texture; and wherein the graphics processing unit comprises processing circuitry configured to, when the graphics processing unit is to use a sub-region of a texture that has an associated fade factor value to generate texturing result data, control the contribution of texture data from the sub-region to the generated texturing result data in accordance with the fade factor value associated with the sub-region.

The Applicants have recognised that virtual texturing may result in new texture pages being loaded into the local memory of the graphics processing system for use, and, correspondingly, in other texture pages being removed from the local memory. The effect of this may then be that new, e.g., more detailed, texture pages become available for use for parts of an, e.g. image being displayed, and/or that other texture pages being used for parts of an, e.g. image being displayed, become no longer available in the local memory of the graphics processing system.

To allow for this, and to smooth the swapping in of new texture pages (and the swapping out of evicted (overwritten) texture pages), in the technology described herein graphics textures are divided into a plurality of sub-regions, and each such sub-region has a fade factor parameter associated with it that can be used to control the contribution that the sub-region in question will make to the result of a texturing process that is to use the texture sub-region in question.

As will be discussed further below, this can allow the texturing operation to better allow for the loading and eviction of texture pages from the local memory, and allow texture paging to be done in a more visually pleasing manner than just a binary "page-is-here"/"page-is-not-here" switch.

The texture sub-regions that fade factors are stored for can be selected as desired. There could, e.g., be a fade factor for each respective mipmap level of the texture. In this case a single fade factor may be set for a (and for each) mipmap level as a whole. Equally, there could, e.g., be a fade factor for individual texels, or blocks of texels within the texture.

In an embodiment, respective sub-regions (sub-areas) within a given mipmap level of a texture can (and will) each have their own respective fade factor value. It is believed that the ability to set individual fade factors for respective sub-regions within a given mipmap level (i.e. for regions (areas) within a mipmap level that are only part of (that are smaller than) the entire mipmap) for a graphics texture is new and advantageous, as it can, e.g., be used, as discussed herein, to improve the operation of virtual texturing systems.

Thus, in an embodiment a mipmap level (and in an embodiment each mipmap level) of the texture is divided into a plurality of sub-regions (sub-areas), and each such sub-region has a fade factor parameter associated with it that can be used to control the contribution that the sub-region in question will make to the result of a texturing process that is to use the texture sub-region in question.

Similarly, another embodiment of the technology described herein, comprises a method of configuring a texture for use in a graphics processing system, the method comprising:

associating respective sub-regions within a given mipmap level of a graphics texture to be used by a graphics processing system with respective fade factor values that can be set by an application that is to use the texture to control the contribution that the sub-region will be used to make to any texturing result that is generated using the mipmap level sub-region in question.

Another embodiment of the technology described herein, comprises a graphics processing system, comprising:

a graphics processing unit that can use graphics textures to generate texturing result data for use when generating rendering output data to be generated by the graphics processing unit; and processing circuitry configured to associate respective sub-regions within a given mipmap level of a graphics texture to be used by the graphics processing unit to generate texturing result data with respective fade factor values that can be set by an application that is to use the texture to control the contribution that the sub-region will be used to make to any texturing result that is generated using the mipmap level sub-region in question.

Another embodiment of the technology described herein, comprises a method of using a graphics texture to generate texturing result data in a graphics processing system in which respective sub-regions within a given mipmap level of a graphics texture to be used by a graphics processing system can be associated with respective fade factor values that can be set by an application that is to use the texture, the method comprising:

the graphics processing system, when using a sub-region of a mipmap level of a texture that has an associated fade factor value to generate texturing result data, controlling the contribution of texture data from the mipmap level sub-region to the generated texturing result data in accordance with the fade factor value associated with the mipmap level sub-region.

Another embodiment of the technology described herein, comprises a graphics processing system, comprising:

a graphics processing unit that can use graphics textures to generate texturing result data for use when generating rendering output data to be generated by the graphics processing unit; and processing circuitry configured to associate respective sub-regions within a given mipmap level of a graphics texture to be used by the graphics processing unit to generate texturing result data with respective fade factor values that can be set by an application that is to use the texture; and wherein the graphics processing unit comprises processing circuitry configured to, when the graphics processing unit is to use a sub-region of a mipmap level of a texture that has an associated fade factor value to generate texturing result data, control the contribution of texture data from the mipmap level sub-region to the generated texturing result data in accordance with the fade factor value associated with the mipmap level sub-region.

In an embodiment, the texture mipmap level sub-regions that have fade factors associated with them comprise pages that the texture has been divided into for the purposes of loading parts of an externally stored texture into a local memory of the graphics processing system. Thus, in an embodiment, the texture sub-regions are texture pages that the texture has been divided into for the purposes of loading parts of a texture from external storage into a local memory of the graphics processing system. In an embodiment each page that the texture is divided into for the purposes of loading it into the local memory of the graphics processing system can have an associated (and corresponding) fade factor parameter that can be set for it (i.e. the fade factors are configured (and stored) on a per-page basis).

The fade factors can be set and used as desired. In an embodiment, the fade factor for a given texture sub-region (e.g. page) can be set by the application that is using the texture (by the application programmer). In an embodiment the fade factor can have a value between 0 and 1.

In an embodiment, the fade factor represents a measure of the extent to which the texture sub-region in question can or should be used to contribute to a texturing output result, e.g. and in an embodiment, such that a low fade factor value indicates that the texture sub-region should only make a small contribution to any texturing output result, and vice-versa.

In an embodiment, the fade factor is used to represent how long the texture sub-region in question has been present in the local memory of the graphics processing system (i.e. the extent to which it has "faded in" to the local memory). Thus, in an embodiment, the fade factor for a texture sub-region is in an embodiment set to a low value when the sub-region (e.g. page) is initially loaded into the local memory of the graphics processing system and then progressively increased over time (in an embodiment until it reaches a, in an embodiment selected, in an embodiment predefined, maximum value) while the texture sub-region remains in the local memory of the graphics processing system.

Similarly, in an embodiment, the fade factor is used to represent how long it is before the texture sub-region in question is to be evicted from the local memory of the graphics processing system (i.e. the extent to which it has "faded out" of the local memory). Thus, in an embodiment, when a texture sub-region (e.g. page) is to be evicted from the local memory of the graphics processing system, the fade factor for the texture sub-region is in an embodiment progressively decreased over time while the texture sub-region remains in the local memory of the graphics processing system, until it reaches a low value (e.g. zero), at which point the texture sub-region is then evicted from the local memory of the graphics processing system.

Thus, in an embodiment, the fade factor is used to represent, and represents or indicates, a measure of the extent to which the texture sub-region in question is present in the local memory of the graphics processing system and available for use to generate texturing output data.

Any texture sub-region (e.g. page) that is not present in the local memory of the graphics processing system is in an embodiment allocated, and/or assumed to have, a fade factor value, such as 0, that indicates that the texture sub-region is not present in the local memory (i.e. that indicates that the texture sub-region is not available to contribute to a texturing output).

In an embodiment, the fade factor can be (and in an embodiment is) set to a low value (e.g. close to 0) (where a fade factor of 0 indicates no contribution to the texture result) when the texture sub-region (e.g. page) in question has just been loaded into the local memory (e.g. so that the new, e.g. texture page, will only make a (very) small contribution to any texturing result at that stage), and then gradually (progressively) increased, e.g. on a frame-by-frame basis, e.g. to increase the contribution that the new texture page will make to any texturing result over time, until the fade factor reaches 1 (where a fade factor of 1 indicates that the page, etc., has fully faded in) (at which point, e.g., the new texture sub-region (e.g. page) will fully contribute to any texturing result). This can be used to cause the new texture sub-region (page) to be gradually faded into the output image (e.g.), resulting in a much more visually pleasing appearance than would be the case if the new sub-region (page) was just swapped in and displayed in full immediately. The reverse process can be used to correspondingly fade out texture sub-regions (pages) that are to be evicted from the local memory (by progressively reducing the fade factor before the, e.g. page, is finally evicted from the local memory), e.g. to avoid evicted, e.g. pages, abruptly popping out of existence in the, e.g., displayed image.

Thus, in an embodiment, respective sub-regions (e.g., and in an embodiment, within a given mipmap level) of a texture to be used by the graphics processing system are associated with respective fade factor values that can be set by an application that is to use the texture to control the contribution that the sub-region will be used to make to any texturing result that is generated using the sub-region in question.

Similarly, in an embodiment, when using a sub-region (e.g., and in an embodiment, of a mipmap level) of a texture that has an associated fade factor value to generate texturing result data, the contribution of texture data from that sub-region to the generated texturing result data is controlled in accordance with the fade factor value associated with the sub-region.

The way that the contribution that a texture sub-region makes to a texturing output is controlled based on the texture sub-region's associated fade factor can be selected as desired.

In an embodiment, the graphics processing system selects, and the processing circuitry of the graphics processing system is configured to select, the contribution of texture data from the texture sub-region to the generated texturing result data in accordance with, and based on, the fade factor value associated with the texture sub-region in question.

In one embodiment, the fade factor associated with a texture sub-region is used to limit the contribution that the sub-region in question can make to a texturing process that is to use (that uses) the texture sub-region in question. In this case, the fade factor will represent the maximum contribution (weight) that the sub-region in question will make to any texturing result that is generated using the texture sub-region in question. Thus, in an embodiment, the fade factor represents a maximum weight (maximum contribution) that the sub-region in question is intended to be able to make to the result of a texturing process that is to use the texture sub-region in question.

Thus, in an embodiment, respective sub-regions, e.g. and in an embodiment within a given mipmap level, of a texture to be used by the graphics processing system are associated with respective fade factor values that can be set by an application that is to use the texture to limit the contribution that the sub-region will make to any texturing result that is generated using the sub-region in question.

Similarly, in an embodiment, when using a sub-region, e.g. of a mipmap level, of a texture that has an associated fade factor value to generate texturing result data, the contribution of texture data from that sub-region to the generated texturing result data is limited in accordance with the fade factor value associated with the sub-region.

If a texture sub-region has a fade factor of N that is less than one (where a fade factor of 1 indicates a "fully" faded-in texture sub-region), the remainder of the texture result contribution is in an embodiment taken from the next higher (less detailed) mipmap level.

In another embodiment, the fade factors associated with respective mipmap level sub-regions covering the same region of a texture are used to limit (to cap) the level of detail to be used when generating a texturing output result for texture positions within the sub-regions in question. In other words, rather than using the fade factors to cap (limit) the contributions of the individual mipmap levels (although this can still be done as well, if desired), the fade factors for plural mipmap level sub-regions are used together to set an overall level of detail limit for the texturing process.

In this case, the fade factors for plural mipmap level sub-regions (and in an embodiment for all the mipmap level sub-regions other than the highest (least detailed) mipmap level) covering the same texture positions are in an embodiment summed, and that fade factor sum then used to limit the level of detail at which the texture will be sampled and used for the texture positions in question.

In an embodiment, if the desired level of detail for the texture look-up (sampling) operation is greater than (i.e. requires more detailed mipmap levels than) the sum of the fade factors, the texturing operation (lookup) instead proceeds using a level of detail equal to or less than (and in an embodiment equal to) the sum of the fade factors.

Where in these arrangements, the sum of fade factors for plural mipmap levels is required, then in an embodiment the system is configured to do one or more of: pre-summing (i.e. prior to run-time) fade factors for some or all of the mipmap pyramid for a texture, caching fade factor sums for later (future) use, and limiting the traversal depth of the mipmap pyramid (i.e. limiting the number of mipmap levels over which the fade factors are summed—for example, summing the fade factors of, e.g., only three mipmap levels above the required level of detail and assuming the rest have fully faded in (have a fade factor of 1) would probably cover most situations that could be encountered in use, whilst avoiding the need to sum the fade factors for all the mipmap levels).

Where fade factors as discussed above are being used, then in an embodiment, the texture look-up process is configured to take account of any fade factors that are associated with the sub-regions (e.g. pages of the mipmap levels) to be used to generate the texturing output result.

Where mipmap levels can be associated with fade factors, then in one embodiment the texturing process is configured such that the weight that is used for a given mipmap level in the texturing output result (i.e. the contribution the mipmap level makes when doing the texture filtering) does not exceed the fade factor that is associated with the (region of the) mipmap level in question. This will have the effect that the fade factor limits the contribution that the texture sub-region in question will make to the texturing output result. This can be achieved as desired.

In one embodiment this is done by adjusting (if necessary) the level of detail (the sampling point in the mipmap pyramid) for the texture lookup process such that the mipmaps being used to generate the texturing output result are sampled and filtered at weights that do not exceed their associated fade factors. In an embodiment, the sum of the fractional fade factor values associated with two mipmap levels being used to generate a texturing output result is used to adjust and select, if necessary, the level of detail point at which to sample (to filter) between the two mipmap levels when generating the texturing output result. Thus, where a mipmap level is only to make a partial contribution to the texturing result because the texturing result is to be filtered from two (or more) mipmap levels, then in an embodiment, the filtered contribution (weight) of the mipmap level in question is, if necessary, adjusted to be not greater than the fade factor associated with the region (e.g. page) of the mipmap level in question that is to be used.

Where the fade factors of the two mipmap levels to be used to generate the texturing result sum to one or more (i.e. can sum together to provide a fully faded-in output result), then the level of detail that determines the relative weights between the two mipmap levels can be adjusted from its original position to a position between the mipmap levels where the sum of the weights for the texture filtering operation equals 1 without the respective weights for the individual mipmap levels exceeding the respective (fractional) fade factors of the mipmap levels. In an embodiment the level of detail (mipmap pyramid sampling point) is moved to the closest point in the mipmap pyramid to the originally desired level of detail to be sampled at which the sum of the weights equals 1 without the respective weights for the individual mipmap levels exceeding the fade factors associated with each mipmap level.

Where the (fractional) fade factors for two adjacent mipmap levels to be used to generate a texturing output result do not sum to an overall weight of 1 (i.e. a fully faded-in image), then in an embodiment the sampling process is adjusted to give a fully faded-in image (i.e. an image where the weighted texture samples sum to an overall weight of 1). Again, this is in an embodiment done such that the contributions (weights) of the individual mipmap levels do not exceed their respective fade factors.

In one embodiment this is achieved by using, if necessary, more than two mipmap levels to contribute to the output texturing result. For example, where the fractional fade factors associated with two mipmap levels to be used to generate a texturing output result sum to less than a weight of 1, then in an embodiment, data from one or more other (and in an embodiment from a third), in an embodiment less detailed, mipmap levels is also used to contribute to (when generating) the texturing output result so as to ensure that an overall weight of 1 for the texturing output result is provided. Thus, in an embodiment, the texturing process is configured to be able to sample values from more than two mipmap levels when generating a texturing output result, in dependence on fade factor values associated with the mipmap levels.

In other embodiments, rather than sampling over more than two mipmap levels to generate the output texturing result where the fade factors associated with two mipmap levels cannot sum to an overall weighted contribution of 1, the level of detail sampling point in the mipmap pyramid is adjusted so as to sample between mipmap levels whose associated fractional fade factors add up to 1 or more (i.e. such that an overall weight of 1 for the texturing output result can be achieved by sampling just two mipmap levels without exceeding the fade factors of the respective mipmap levels). This is in an embodiment achieved by moving the sampling position (level of detail) upwards in the mipmap primitive (i.e. in the direction of the less detailed mipmap levels) to a point in the mipmap pyramid where the sum of the weights of the two respective mipmap levels can equal 1 without the respective weights for the individual mipmap levels exceeding the fade factors associated with the mipmap levels in question. Such adjustment of the level of detail sampling position can be achieved as desired.

In an embodiment, the texture lookup process is configured such that if the least detailed mipmap level to be used for a given texture lookup has fading applied to it (e.g. has a fade factor of less than one), the texture lookup process uses a less detailed mipmap level for the texture lookup instead, in an embodiment by moving, in an embodiment progressively, up the mipmap pyramid until it finds a less detailed mipmap level that can be used such that the contributions (weights) of the individual mipmap levels do not exceed their respective fade factors.

In an embodiment, the texture lookup process is configured to ensure that the least detailed mipmap level that is being used has no fading applied to it at all (i.e. has a fade factor of 1, where a fade factor of 1 indicates no fading). Thus, if the least detailed mipmap level to be used for a given texture lookup has fading applied to it (e.g. has a fade factor of less than one), in an embodiment the texture lookup process instead uses as the least detailed mipmap level for the texture lookup a less detailed mipmap level, and in an embodiment the next least detailed mipmap level, that has fully faded in (e.g. that has a fade factor of 1), in an embodiment by moving up the mipmap pyramid until it finds a less (and in an embodiment the next least) detailed mipmap level that has fully faded in (e.g. has a fade factor of 1). This can ensure, for example, that where the texturing operation is to use two different mipmap levels, the least detailed level will be fully faded in (with the other level potentially still fading in).

Thus, in an embodiment, when the texturing operation of the graphics processing system is to use a region of a texture that is stored externally to the graphics processing system, it is further determined if the page of the texture at the least detailed mipmap level encompassing the region of the texture to be used when generating the texturing output data has any fading to be applied to it, and if the required page of the texture at the least detailed of the two particular mipmap levels to be used when generating the texturing output data has fading applied to it, a page of the texture at a less detailed mipmap level and that encompasses the required region of the texture, and in an embodiment that does not have any fading applied to it, is used as the least detailed mipmap level when generating the texturing output data instead.

Similarly, in an embodiment if the most detailed mipmap level to be used to contribute to the texturing result has a fade factor that is less than its weighted contribution to the texturing result, the level of detail sampling point in the mipmap pyramid for the texture lookup is adjusted such that the most detailed mipmap level's weighted contribution to the texturing result will be less than or equal to (and in an embodiment equal to) its associated fade factor, in an embodiment by moving up the mipmap pyramid to a level of detail sampling point for which the mipmap level's weighted contribution to the texturing result will be less than or equal to (and in an embodiment equal to) its associated fade factor.

In an embodiment if the most detailed mipmap level to be used to contribute to the texturing result has a fade factor that is less than its weighted contribution to the texturing result, the texture lookup uses instead the next least detailed mipmap level that has a fade factor that is equal to or greater than the mipmap level's weighted contribution to the texturing result, in an embodiment by moving up the mipmap pyramid until it finds the next least detailed mipmap level that has a fade factor that is equal to or greater than the mipmap level's weighted contribution to the texturing result.

Thus, in an embodiment, when the texturing operation of the graphics processing system is to use a region of a texture that is stored externally to the graphics processing system at two particular mipmap levels to generate texturing output data, it is further determined if the page of the texture at the most detailed of the two particular mipmap levels encompassing the region of the texture to be used to generate the texturing output data has any fading to be applied to it, and if the required page of the texture at the most detailed of the two particular mipmap levels has fading applied to it, and the most detailed mipmap level to be used to contribute to the texturing result has a fade factor that is less than its intended weighted contribution to the texturing result, the level of detail sampling point in the mipmap pyramid for the texture lookup is adjusted such that the most detailed mipmap level's weighted contribution to the texturing result will be less than or equal to (and in an embodiment equal to) its associated fade factor, in an embodiment by moving up the mipmap pyramid to a level of detail sampling point for which the mipmap level's weighted contribution to the texturing result will be equal to or less than (and in an embodiment equal to) its associated fade factor.

In another embodiment, where the sum of fade factors for plural mipmap levels is to be used as an overall level of detail limit, then instead of using the individual texture sub-region fade factors to limit the contribution of each texture sub-region individually, the texture look-up process is configured such that the level of detail that is used for a given texturing operation (lookup) does not exceed the sum of the fade factors for respective mipmap level sub-regions covering the texture positions in question. This will have the effect that the sum of the fade factors for the plural mipmap levels will limit the overall level of detail to be used for the texturing operation. This can be achieved as desired. It is in an embodiment done without also using the individual texture sub-region fade factors to limit the contribution of each texture sub-region individually.

In one embodiment, this is done by adjusting (if necessary) the level of detail (the sampling point in the mipmap pyramid) for the texture lookup process such that it does not exceed the sum of the fade factors for the mipmap levels being considered. Thus, in an embodiment, the sum of the fade factor values associated with plural mipmap levels for a texture region for which a texturing process is to be performed is used to adjust and to select, if necessary, the level of detail point at which sample (to filter) the mipmap pyramid when generating the texturing output result. In an embodiment, if the desired level of detail is greater than the sum of the fade factor values, the level of detail for the texture lookup is adjusted to be less than or equal to (and in an embodiment to be equal to) the sum of the fade factor values.

Where a sum of fade factors for plural mipmap levels is to be used to control the texture lookup operation (the texturing process), then in an embodiment a sum of fade factors for three or more mipmap levels is used. In an embodiment the sum of the fade factors for all the mipmap levels save the highest (least detailed) mipmap level is used.

It will be appreciated from the above, that in general where fade factors are being used, the texture lookup process is in an embodiment configured to select, and if necessary adjust, the level of detail to be used for the lookup process based on the fade factor(s) associated with respective texture (mipmap level) sub-region(s).

Thus, in an embodiment, the technology described herein comprises selecting the level of detail to be used for the texture lookup process in accordance with one or more fade factors associated with one or more mipmap levels of the texture. In an embodiment, it is determined whether the level of detail to be used for the texture lookup process should be adjusted based on the fade factor or factors, and if it is determined that the level of detail to be used for the texture lookup process should be adjusted based on the fade factor or factors, the level of detail to be used for the texture lookup process is then adjusted based on the fade factor or factors (and the texture lookup process then performed using the adjusted level of detail).

As discussed above, these arrangements may comprise selecting and/or adjusting the level of detail based on the fade factor associated with a given single, particular mipmap level, or selecting and/or adjusting the level of detail based on the fade factors associated with plural mipmap levels (and in an embodiment based on the sum of the fade factors associated with the plural mipmap levels).

The textures (texture maps) that are used in the technology described herein can represent any suitable texture data. In one embodiment, the texture is a texture that is to be used for graphics processing, e.g., and in an embodiment, when rendering an image and/or frame for display, such as for example an image to be applied to primitives to be rendered, colors (including grayscale), luminances, bump-maps, shadow-maps (light-maps), etc., as is known in the art.

However, the technology described herein can also be used with textures to be used to process, and that represent, other forms of data, e.g. where it is desired to use a graphics texture (and graphics texture processing) to represent and process other forms of data. As is known in the art, textures can be and are used in graphics processing to represent and process many different kinds of data, such as, 3D fog, flow fields, etc. as well as for "traditional" graphics purposes. The technology described herein can equally be applied to, and extends to, these kinds and uses of textures in, and for, graphics processing systems. Thus the textures used in the technology described herein may represent other forms of data that are to be processed as a texture in a graphics processing system, if desired.

The textures should be in the form of mipmaps (as a mipmap pyramid), i.e. as a sequence of textures, each of which is a progressively lower resolution (less detailed) representation of the same texture (e.g. image). Unless otherwise indicated, references herein to higher and lower mipmap levels refer to less and more detailed mipmaps, respectively.

As discussed above, the technology described herein is particularly intended for use in virtual texturing systems and arrangements, i.e. in graphics processing systems in which textures to be used by the graphics processing system can be stored externally to the graphics processing system and pages of the textures then loaded into a local memory of the graphics processing system for use by the graphics processing system to generate texturing output data. Thus, the graphics processing system of the technology described herein is in an embodiment a graphics processing system in which textures to be used by the graphics processing system can be stored externally to the graphics processing system and pages of the textures then loaded into a local memory of the graphics processing system for use by the graphics processing system to generate texturing output data, and in an embodiment comprises a graphics processing unit for generating texturing output data using graphics textures, and a local memory accessible to the graphics processing unit and that stores for use by the graphics processing unit pages of textures that are stored externally to the graphics processing system.

The overall texture can be stored externally to the graphics processing system in any desired external storage, such a main memory of the host system that is using the graphics processing system, such as a hard disk or disks, or a solid state disk, some other form of external storage medium, such as an optical disk (DVD or CD-ROM), flash memory, hard drive, or remotely and accessed over a network connection, etc.

The overall texture can be stored externally to the graphics processing system in any desired form that can represent the texture. Thus it may, for example, be stored in the form that it is to be used by the graphics processing system, or in an alternative form, such as a compressed form, that is to be transformed and/or decoded (e.g. decompressed) for use by the graphics processing system. The texture could also, e.g., be stored externally to the graphics processing system in the form of a routine or procedure that is to be executed to generate the texture data to be used by the graphics processing system (e.g. in the case of a "procedural texture").

The loading of pages of the externally stored texture into the local memory of the graphics processing system may correspondingly comprise, e.g., simply copying pages of the texture from the external storage into the local memory of the graphics processing system, transforming or decoding (e.g. decompressing) the texture as stored in the external storage medium and then storing (loading) the transformed and/or decoded texture pages in the local memory of the graphics processing system, or executing a function or routine representing the texture that is stored externally to the graphics processing system to thereby generate a page or pages of the texture for use by the graphics processing system that is then loaded into the local memory of or accessible to the graphics processing system.

It will also be appreciated here that where the texture page that is loaded into the local memory of the graphics processing system for use by the graphics processing system is generated from a stored routine (e.g.), or is a transformed version of the texture page that is stored externally to the graphics processing system (e.g.), then there may not or will not actually be a page in the representation of the texture that is stored externally to the graphics processing system that corresponds to or matches the page of the texture that is loaded into the local memory of the graphics processing system for use by the graphics processing system.

It may also be the case that the texture page or pages in question have already been loaded into the physical memory of and accessible to the graphics processing unit, such as a shared main system RAM, e.g. for use or processing by the host system, but have not yet been made available to the graphics processing system for use. In this case, the texture page may accordingly be loaded into the local memory of the graphics processing system (within the context of the technology described herein) by making the texture page that is already stored in the physical memory accessible to the graphics processing system, visible to and available to the graphics processing unit (by mapping the page into the graphics processing unit's local memory space).

Equally the loading of pages of textures that are stored externally to the graphics processing system into the local memory of the graphics processing system for use by the graphics processing system to generate texturing output data may involve loading the texture pages at the time that the graphics processing system actually needs to use them, or it may be the case that the texture pages are loaded into the local memory at some earlier time, and then are, for example, mapped into the graphics processing system's view of the local memory at the time they are to be used.

The local memory of the graphics processing system can be any suitable local memory of or accessible to the graphics processing unit (GPU), i.e. a memory of or accessible to the graphics processing unit (GPU) for which the access time and bandwidth (as seen by the GPU) is sufficient for (for the memory to be used for) run-time operation of the graphics processing unit, such as a RAM (random access memory) provided for the graphics processing system, such as the GPU's L2 cache, etc. It could, e.g., be DDR memory or on-chip eDRAM. The local memory could be dedicated to the graphics processing unit (e.g. dedicated GPU RAM), or it could be in memory that is shared with other processors, such as main system RAM shared with the host CPU. Where the local memory of the graphics processing system is in (physical) memory that is shared with other processors, such main system RAM shared with a host CPU, then unless the context otherwise requires, references herein to the local memory of the graphics processing system refer to that part of the shared memory that is accessible (visible) to the graphics processing unit (that is mapped into the GPU space).

The pages that the texture is divided into for the purposes of loading and storing the texture in the local memory of the graphics processing system can be configured as desired. As in conventional memory management arrangements, each page is in an embodiment of a fixed (and the same) size (in terms of the memory space it occupies). Each page will encompass a given (and different) region of the texture. Each page in an embodiment encompasses a contiguous, rectangular (including square) region of the texture. Within a given mipmap level, each page in an embodiment represents (and will typically represent) the same size of region (area) within the texture, but as the pages are in an embodiment fixed in terms of their memory size, pages for higher (less detailed) mipmap levels will encompass larger regions (areas) of the texture and vice-versa.

The texture pages may correspond in size to the memory pages that are otherwise used in the virtual memory system of the host system that the graphics processing unit is associated with, but this is not essential, and the texture pages may differ in size to the virtual memory pages otherwise used in the system. In an embodiment, the texture pages are an integer multiple of the size of the virtual memory pages that the system uses, as this makes the handling of the texture pages more straightforward (e.g. makes mapping them into the local memory easier). A suitable size for the texture pages is 64 kB, as textures are large and the tracking overhead of smaller pages can accordingly become quite costly.

To facilitate page handling, the system in an embodiment further includes a page table used to map each page of the texture to the memory region (in the local memory) where it is stored, in an embodiment in conjunction with a translation lookaside buffer (TLB), as is known in the art. The page tables may, e.g., be stored in system memory, typically DDR, such as in main RAM of the system like the page tables used by the existing memory management unit (MMU). The translation lookaside buffer may, e.g., be provided as a hardware unit within the graphics processing unit (GPU).

In an embodiment, if the page of an externally stored texture that is needed to generate texturing output data is not present (available) in the local memory of the graphics processing system (i.e. there is, in effect, a texture page "miss" or "fault"), rather than simply stalling the rendering process while the correct page of the texture is loaded, the graphics processing system looks for, and uses, a less detailed mipmap (a higher mipmap level) instead. In other words, if the graphics processor encounters a "page miss" at the desired mipmap (detail) level, it in an embodiment looks for a less detailed version of the region of the texture in question in the local memory of the graphics processing system, and then uses that less detailed version of the region of the texture in question to generate the texturing output data.

This has the advantage that the texturing process (and thus the rendering process) will still be progressed (rather than it having to be stalled, for example) when a texture page miss occurs. Also, because a less detailed mipmap that encompasses the region of the texture in question is used, the output texture data is generated using an approximation to the originally desired texture data, which should therefore produce a more visually acceptable texturing (rendering) result as compared, e.g., to simply applying a default color in the event of a texture page miss.

Thus, in an embodiment, in the event that it is determined that the page of the texture at the particular mipmap level encompassing the region of the texture to be used to generate texturing output data is not available in the local memory of the graphics processing system, the texturing process in an embodiment still proceeds using another page of the texture that encompasses the region of the texture to be used to generate the texturing output data that is available in the local memory of the graphics processing system (in an embodiment at a higher (less detailed) mipmap level) to generate the texturing output data.

Thus, in an embodiment, when the texturing operation of the graphics processing system is to use a texture that is stored externally to the graphics processing system at a particular mipmap level to generate texturing output data, the graphics processing system determines if the page of the texture at the particular mipmap level and encompassing the region of the texture to be used to generate the texturing output data is available in the local memory of the graphics processing system, and if the required page of the texture at the particular mipmap level is not available in the local memory of the graphics processing system, determines if a page of the texture at a less detailed mipmap level than the particular mipmap level and that encompasses the required region of the texture to be used to generate the texturing output data is available in the local memory of the graphics processing system, and, if a page of the texture that encompasses the required region of the texture to be used to generate the texturing output data at a less detailed mipmap level than the particular mipmap level is available in the local memory of the graphics processing system, uses the available page of the texture that is at a less detailed mipmap level than the particular mipmap level to generate the texturing output data.

Similarly, in an embodiment the graphics processing unit comprises processing circuitry configured to, when the texturing operation of the graphics processing system is to use a texture that is stored externally to the graphics processing system at a particular mipmap level to generate texturing output data, determine if the page of the texture at the particular mipmap level and encompassing the region of the texture to be used to generate the texturing output data is available in the local memory of the graphics processing system, and if the required page of the texture at the particular mipmap level is not available in the local memory of the graphics processing system, determine if a page of the texture at a less detailed mipmap level than the particular mipmap level and that encompasses the required region of the texture to be used to generate the texturing output data is available in the local memory of the graphics processing system, and, if a page of the texture that encompasses the required region of the texture to be used to generate the texturing output data at a less detailed mipmap level than the particular mipmap level is available in the local memory of the graphics processing system, use the available page of the texture that is at a less detailed mipmap level than the particular mipmap level to generate the texturing output data.

The process of identifying if a higher (less detailed) mipmap level is available in the local memory of the graphics processing system in the event of a page miss at the originally desired mipmap level can be implemented in any desired and suitable manner. In an embodiment, the graphics processing system checks for higher (less detailed) mipmap levels in order from more to less detailed mipmap levels (i.e. progressively works its way up the mip-map pyramid), until it finds texture data for the texture region (for the texel positions) in question. This will have the effect that the more (or the most) detailed texture data actually available in the local memory will be used in place of the desired texture data. Thus, in an embodiment, the most detailed texture data available in the local memory is used in place of the originally desired texture data.

It will be appreciated here that if the highest (least detailed) level(s) of the mipmap pyramid are resident in the local memory, this process will eventually always find texture data it can use. If necessary, the process can also be configured such that if it determines that no texture data encompassing the required region of the texture is stored in the local memory, then some alternative fail or default mechanism for handling that event is triggered.

In one embodiment, the process steps up one mipmap level and checks if the texture data is present, at a time, in an iterative process (i.e. checks whether each successive less detailed mipmap level is available in the local memory in turn), until it finds texture data it can use.

Thus, in an embodiment, if the required page of the texture at the particular mipmap level is not available in the local memory of the graphics processing system, it is determined if a page of the texture at the next lower detailed mipmap level than the particular mipmap level that encompasses the required region of the texture to be used to generate the texturing output data is available in the local memory of the graphics processing system (and, if so, that page is then used to generate the texturing output data), and if the page of the texture that encompasses the required region of the texture to be used to generate the texturing output data at the next lower detailed mipmap level than the particular mipmap level is not available in the local memory of the graphics processing system, it is determined if a page of the texture at the next lower detailed mipmap level than the next lower detailed mipmap level than the particular mipmap level that encompasses the required region of the texture to be used to generate the texturing output data is available in the local memory of the graphics processing system (and, if so, that page is then used to generate the texturing output data), and so on, until a mipmap level that encompasses the required region of the texture and that is available in the local memory of the graphics processing system is found.

In another embodiment, the process can skip mipmap levels, e.g., and in an embodiment, where it is known that those mipmap levels are not stored in the local memory either. This will speed the process of identifying the texture data to use.

To facilitate this, in an embodiment metadata indicating the next (lower detail) mipmap level to try (i.e. that may be the next lower detail mipmap for which valid data pages for the given texture region (position) is stored in the local memory) is in an embodiment associated with (stored for) the pages of the texture that are not present in the local memory. For example, where a page table is used to map the texture pages to their memory locations, each page that is not stored in the local memory could have data included for it in the page table that indicates the next mipmap level to try if that (missing) page is required by the texture mapping process. As this data is only required for pages that are not stored in the local memory, it is in an embodiment provided by reusing data fields (bits) (e.g. in the page table) that are already present and used for another purpose for pages that are present in the local memory.

In these arrangements, the texture mapping process, when it encounters a page miss (i.e. the texture data at the desired mipmap level is not available in the local memory), in an embodiment then uses this "next valid mipmap level" data (information) to identify the next mipmap level to try (and then determines if the relevant page of that mipmap level is available in the local memory), rather than simply trying the next higher (less detailed) mipmap level. This will then allow the texture lookup process to skip checking for mipmap levels that it is known are not present in the local memory, thereby speeding up the process of identifying the texture data to use when a page miss occurs.

Thus, in an embodiment, data indicating a next (lower detail) mipmap level to try is associated with (stored for) the pages of the texture that are not present in the local memory, and if the required page of the texture at a given mipmap level is found not to be available in the local memory of the graphics processing system, the data indicating the next (lower detail) mipmap level to try associated with the page of the texture that is not present in the local memory is used to determine the next lower detailed mipmap level for which it should be determined whether a page that encompasses the required region of the texture to be used to generate the texturing output data is available in the local memory of the graphics processing system (and it is then determined whether a page of the texture that encompasses the required region of the texture to be used to generate the texturing output data at the indicated lower detailed mipmap level is available in the local memory of the graphics processing system or not).

If necessary, the system may be configured to always load (and keep) the highest (least detailed) mipmap level for a texture being used in the local memory, so that there will always be some texture data in the local memory that can be used in the case of a page miss. (Loading the highest mipmap level may be likely to always take place anyway, or may be the default procedure for other reasons, so it may not be necessary to deliberately do this.) It would also be possible to set up some default operation, e.g. to apply a default color, or to trigger a fail event, that is performed in the event that there is no useable texture data identified in the local memory, if desired.

The above discusses an embodiment of the operation where the required page of the texture at the particular mipmap level (the originally desired mipmap level) is not present in the local memory of the graphics processing system. In the case where the required page of the texture at the particular mipmap level (the originally desired mipmap level) is present in the local memory of the graphics processing system, then that page of the texture can simply be used to generate the texturing output data as originally desired. Thus, in one embodiment, the method comprises, and the processing circuitry of the graphics processing unit is configured to, if the required page of the texture at the particular mipmap level is available (stored) in the local memory of the graphics processing system, using that page of the texture to generate the texturing output data. However, in other embodiments, even where the required page of the texture at the particular mipmap level (the originally desired mipmap level) is present in the local memory of the graphics processing system, other mipmap levels than the particularly mipmap level are still used instead to generate the texturing output data. Examples of this are discussed herein.

Once the texture data to use for the texturing operation has been identified in the local memory, that texture data can then be used by the texturing operation (by the graphics processing unit) to generate the texturing output data. The so-generated, texturing output data can then be, and in an embodiment is then, applied, as is known in the art, to a sampling position or positions and/or a fragment or fragments that are being rendered to generate rendered data for the sampling position(s) and/or fragment(s), which rendered data is then, e.g., and in an embodiment, written to a tile or other buffer, e.g. for output to a frame buffer for a display to display the "textured" sampling position(s) and/or fragment(s).

In an embodiment, the method and system of the technology described herein further comprise, if it is determined that the required page of the texture at the desired mipmap level is not available in the local memory, also triggering the loading of (and loading) that desired page of the texture at the desired mipmap level into the local memory of the graphics processing system (so that it is then available for future use by the texturing process). In other words, when a texture page miss (a page fault) is encountered, the loading of the missing page into the local memory of the graphics processing system is in an embodiment triggered.

(As discussed above, the loading of the missing page into the local memory of the graphics processing system could comprise, e.g., simply copying the texture page from where it is externally stored into the local memory of the graphics processing system, or transforming or otherwise processing a page of texture data stored externally to the graphics processing system to generate the page that is then loaded into the local memory of the graphics processing system for use by the graphics processing system, or executing some function or routine to generate the texture page that is loaded into the local memory of the graphics processing system for use by the graphics processing system.)

The loading of missing texture pages into the local memory of the graphics processing system can be triggered as desired. However, in an embodiment, the texture mapping process is configured to record information about the use of the various pages of the texture by the texture mapping process, which information can then be accessed (and, e.g., interrogated) by a host processor, e.g. by the application that is being executed on the host processor and that is using the graphics processing system, associated with the graphics processing system to then allow the host processor, e.g. application, to use that page "use" information to manage the loading and storing of the texture pages in the local memory of the graphics processing system.

This page "use" information can take any suitable and desired form. In an embodiment it comprises a page accessed flag (e.g. bit) that can be set by the texture look-up process when an attempt to access (to use) the relevant page of the texture is made by the texture look-up process. Thus, in an embodiment, each separate page of the overall texture that can be loaded into the local memory has page usage information associated with it, in an embodiment in the form of an accessed flag that can be set by the texture look-up operation, to indicate that that texture page has been requested by the texture look-up operation.

The page usage information is in an embodiment updated to record an attempt to use the page whenever an attempt to use the page is made. Thus, in an embodiment, the page usage information is updated to record a page access (e.g. the page access bit is set) when an access is attempted to a page that is not stored in the local memory (i.e. a page access attempt is recorded irrespective of whether the page was actually present in the local memory or not). The Applicants have recognised it can still be useful to record "failed" texture page access attempts, as that can then be used, e.g., to indicate which pages that are missing from the local memory should be loaded into the local memory for use, and/or to avoid duplication when determining which missing pages should be loaded into the local memory.

Thus, in an embodiment, when the texturing operation of the graphics processing system is to use a texture that is stored externally to the graphics processing system at a particular mipmap level to generate texturing output data, it is noted in data associated with that page of the texture that an attempt to access that page of the texture has been made, irrespective of whether the page of the texture was available (stored) in the local memory or not.

Where usage information for texture pages is recorded, then in an embodiment the host system that is using the graphics processing system (e.g. the driver for the graphics processing unit (GPU), and/or the application that is using the graphics processing system) is configured to, e.g. periodically, assess or interrogate the usage information to determine which pages have been in recent use (and which have not), so as to allow the host system, e.g., to make an informed decision on which pages can be evicted and/or to evict from the local memory. For example, the host system could be configured to perform a sweep through the page accessed bits at regular intervals, recording which pages had been accessed (at that time), and then clearing the accessed bits for use for the next monitoring interval, and so on.

Thus, in an embodiment, the host system that is using the graphics processing system is configured to use the texture page usage information recorded by the graphics processing system to manage and/or control the storing of the texture pages in the local memory of the graphics processing system (e.g. to determine which pages to evict/overwrite when a new page is to be loaded).

More sophisticated texture page usage tracking could be performed if desired. For example, the frequency that each page is requested (accessed) could be tracked and recorded, e.g. by counting the actual number of requests (attempted accesses) to the (and to each) texture page. This will then, e.g., indicate a greater (or lesser) need for missing texture pages, for example. In this case, as maintaining full per-page counts could be expensive, in an embodiment a sparse counting arrangement, e.g. that performs each counter increment with a fixed small probability, is used to reduce the overall counter activity (this will still provide more useful information about the texture usage than simply using a single accessed (requested) bit).

Where usage data, such as accessed bits, is to be maintained for the texture pages, then this data is in an embodiment stored in a page table that is associated with the texture.

As well as (or instead of, but in an embodiment as well as) recording information about the use of the various pages of the texture by the texture mapping process, the texture lookup process is in an embodiment configured to maintain a list of texture pages that are "missing" from the local memory. Thus, in an embodiment, the loading of missing texture pages into the local memory of the graphics processing system is triggered by adding the missing page to a separate "page fault" (missing pages) list, which missing pages list can then, e.g., be queried by the host processor, e.g., by the application that is using the texture, to handle and control the loading of the missing pages into the local memory of the graphics processing system. In other words, missing texture pages are in an embodiment batched together to produce a list of missing pages (page faults).

Batching up page faults in this manner can facilitate the underlying storage system holding the overall texture (and thus the pages that are not resident in the local memory of the graphics processing system) maximising the rate at which the missing pages can be loaded to the local memory of the graphics processing system, e.g. by reordering, pipelining or otherwise optimising the missing page accesses. Generating a separate list of missing pages (page faults) also avoids the need to scan the page tables to determine which pages encountered page faults, and having a list that is separate from the page tables means that it can be scanned more quickly by the host CPU. Using a list in this way also has the benefit that the page misses can be handled separately, e.g. in software, whilst new page misses are being generated.

Thus, in an embodiment, if it is determined that the page of the texture at the particular mipmap level and encompassing the region of the texture to be used to generate the texturing output data is not available in the local memory of the graphics processing system, an identifier indicating the page of the texture that was found not to be present in the local memory is added to a separate list of missing pages of the texture, to thereby trigger subsequent loading of the page of the texture that was found not to be present in the local memory into the local memory of the graphics processing system.

The missing pages list may be configured and implemented as desired, e.g. as a FIFO.

The page miss (page fault) detection and tracking (and missing pages list updating) is in an embodiment run (and implemented) as part of the (fixed function) texture look-up operation of the graphics processing system. This then avoids the need to use and execute shader code (instructions) for this purpose.

These embodiments of the technology described herein in an embodiment further include, e.g. and in an embodiment, the host system, e.g. the host CPU, or an application running on the host CPU, etc., loading "missing" texture pages into the local memory of the graphics processing system on the basis of the missing pages list. (As discussed above, the loading of the missing texture pages into the local memory of the graphics processing system could comprise, e.g., simply copying the pages from where they are externally stored into the local memory of the graphics processing system, or transforming or otherwise processing pages of texture data stored externally to the graphics processing system to generate the pages that are then loaded into the local memory of the graphics processing system for use by the graphics processing system, or executing some function or routine to generate the texture pages that are loaded into the local memory of the graphics processing system for use by the graphics processing system.)

The addition of a missing page to the missing pages list can be implemented as desired. For example, a page miss in the texture look-up process could be configured to trigger an exception that will be passed to an exception handler that then adds the missing page to the missing pages list. Alternatively (and in an embodiment this is what is done), a dedicated hardware element, or separate processing unit, could be used to do this.

The arrangement is in an embodiment such that only a single entry for a missing page is included in the "missing pages" list (i.e. such that duplicated missing page entries are avoided in the missing pages list (which could otherwise then have to be filtered out)). Thus, in an embodiment, the missing page list operation is configured such that a missing page is not added to the list if that page already exists in the list.

In an embodiment, this is facilitated by having data for each page that can be used to determine if the page has been added to the missing pages list already or not. In one embodiment this is done by determining the state of data (e.g. a flag or flags) that can be used for this purpose. In an embodiment, there is a flag (or flags) for each page that will be set if the page has been added to the missing pages list, and it is then determined if that flag has already been set before adding the page to the "missing pages" list. For example, the state of a "valid" page bit and/or of a "page accessed" bit could be used to indicate and to check whether a page has been added to the missing pages list or not. Alternatively, each page of the texture could have a "page-fault-recorded" flag (e.g. bit) associated with it that is set when an attempt to access that part of the texture in the local memory fails (i.e. a "page miss" is encountered) and the page is added to the "missing pages" list.

It will be appreciated from the above that in embodiments of the technology described herein, the texture lookup process is configured to, when a texture look-up for a texture page in the local memory of the graphics processing system is performed, record that that texture page has been requested, and if that texture page is not present in the local memory, to add the texture page (in an embodiment only if it is not already listed) to a list of texture pages to be loaded into the local memory.

It will be appreciated from the above that in embodiments of the technology described herein, each separate page that a texture to be used in a virtual texturing process is divided into may have a number of items of information associated with it (stored for it), as well as a fade factor, such as page usage information, and an indication of whether (and where) that texture page is stored in the local memory of the graphics processing system. This data can be stored in any suitable and desired manner. However, in an embodiment it is stored in a page table (or equivalent data structure) that is associated with the texture and that stores for each page the texture has been divided into, one or more of, and in an embodiment all of: an indication of whether the page is currently available in (loaded into) the local memory of the graphics processing system or not (in an embodiment in the form of a page valid bit); an indication of whether the page has been recently requested by the texture lookup process or not (in an embodiment in the form of an accessed bit) (in an embodiment irrespective of whether the page is present in the local memory or not); and, for pages that are present in the local memory: an indication of where the page is located in the local memory (in an embodiment in the form of a page address), and a fade factor value for the page.

For pages that are not present in the local memory, in an embodiment an indication of the next higher (less detailed) mipmap level covering the same region of the texture to try (that should be stored) in the local memory is stored, in an embodiment in the form of an index indicating the higher mipmap level in question. This mipmap information is in an embodiment stored in a field that is used for another purpose when the page is present in the local memory, such as the page address or fade factor field.

The page table may be configured as desired, e.g. as part of a normal page table, or as a separate dedicated memory structure. The texture page tables could be stored in the same page table as the system's MMU uses, or in a separate page table, for example. Equally, the texture page tables' data could be stored in a distributed fashion, e.g. with the memory address mapping in the MMU page tables, but the other data (next-mipmap indicators, accessed-flags, fade values, etc.) in a separate table or tables. The page table, etc., should be stored in a manner that is accessible to the graphics processing unit, such as in the local memory of the graphics processing system.

The methods and apparatus of the technology described herein can be implemented in any appropriate manner, e.g. in hardware or software, and in (and be included in) any appropriate device or component. In an embodiment, the methods and apparatus of the technology described herein are implemented in hardware, in an embodiment on a single semi-conductor platform.

The technology described herein may, for example, be implemented on a graphics processor or graphics processing device, and accordingly extends to a graphics processor and a graphics processing platform including the apparatus or system of, or operated in accordance with the method of, any one or more of the embodiments of the technology described herein described herein. Subject to any hardware necessary to carry out the specific functions discussed above, such a graphics processor can otherwise include any one or more or all of the usual functional units, etc., that graphics processors include.

The texturing (texture look-up) process of the graphics processor (and the graphics processor (GPU)) can be configured to operate in the manner of the embodiments of the technology described herein in any desired and suitable manner. For example, the processes could be implemented by means of a software routine inserted by the compiler. In an embodiment, the processes are hardware implemented, i.e. they are provided as a built-in function of the texturing (the texture mapping) hardware (of the graphics processor (GPU)).

The technology described herein can be implemented in any suitable system, such as a suitably configured microprocessor based system that includes a host system (and a host processor (CPU)) that can execute an application that requires graphics processing operations, and a graphics processing system (that includes a graphics processing unit (GPU)) that will perform graphics processing operations in response to commands and data received from the host system, with the host system and/or graphics processing system then being in accordance with, and including, as appropriate, the apparatus, etc., of, the technology described herein, and/or operating in the manner of the methods of the technology described herein when performing virtual texturing.

The technology described herein accordingly also extends to an overall data processing system in which the graphics processing system of the technology described herein may be incorporated.

Thus, another embodiment of the technology described herein, comprises a data processing system comprising:
a host system;
a graphics processing system; and
memory of or accessible to the host system that stores textures for use by the graphics processing system;
wherein:
the host system comprises:
a host processor that can execute applications that require graphics processing operations of the graphics processing system; and
processing circuitry for loading pages of the textures that are stored in the memory of or accessible to the host system into a local memory of the graphics processing system for use by the graphics processing system to generate texturing output data; and wherein the graphics processing system comprises:
a graphics processing unit for generating texturing output data using graphics textures;
a local memory accessible to the graphics processing unit and that stores pages of the textures that are stored in the memory of or accessible to the host system that have been loaded into the local memory of the graphics processing system for use by the graphics processing system to generate texturing output data;
and processing circuitry in accordance with any of the embodiments of the technology described herein described herein.

Similarly, another embodiment of the technology described herein, comprises a method of operating a data processing system comprising:
a host system;
a graphics processing system; and
a memory of or accessible to the host system that stores textures for use by the graphics processing system;
wherein:
the host system comprises:
a host processor that can execute applications that require graphics processing operations of the graphics processing system; and
and
wherein the graphics processing system comprises:
a graphics processing unit for generating texturing output data using graphics textures; and
a local memory accessible to the graphics processing unit;
the method comprising:
loading pages of the textures that are stored in the memory of or accessible to the host system into the local memory of the graphics processing system for use by the graphics processing system to generate texturing output data;
and the graphics processing system operating in accordance with the method of any of the embodiments of the technology described herein described herein when generating texturing output data using textures that are stored in the memory of or accessible to the host system.

As will be appreciated by those skilled in the art, these embodiments of the technology described herein can include any one or more or all of the features of the technology described herein, as appropriate.

Thus, for example, the graphics processing system can include one or more of the features of that system described herein. Similarly, the host system can include one or more of the features of that system described herein.

Similarly, the textures may be stored in the memory of or accessible to the host system that stores textures for use by the graphics processing system in any desired form that can represent the texture. Thus the textures may, for example, be stored in the form that they are to be used by the graphics processing system, or in an alternative form, such as a compressed form, that is to be transformed and/or decoded (e.g. decompressed) for use by the graphics processing system, or in the form of some routine or procedure that is to be executed to generate the texture data to be used by the graphics processing system.

Similarly, the loading of the texture pages into the local memory of the graphics processing system for use could comprise, e.g., simply copying the texture pages from where they are stored into the local memory of the graphics processing system, or transforming or otherwise processing pages of texture data stored externally to the graphics processing system to generate the texture pages that are then loaded into the local memory of the graphics processing system for use by the graphics processing system, or executing some stored function or routine to generate the texture pages that are loaded into the local memory of the graphics processing system for use by the graphics processing system, or making a page that is already stored in (physical) memory accessible to the graphics processing system visible to and available to the graphics processing unit (by mapping the page into the graphics processing unit's local memory space).

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements or processing circuitry and/or programmable hardware elements or processing circuitry that can be programmed to operate in the desired manner. The various functional elements may be separate to each other or may share circuitry (e.g. be performed by the same processor and/or processing circuitry) as desired.

In one embodiment the apparatus of the technology described herein comprises dedicated (non-programmable) processing circuitry configured to operate in the manner described. In another embodiment, it comprises programmable processing circuitry that is programmed to operate in the manner described. In other embodiments, some elements of the apparatus of the technology described herein are provided by dedicated (non-programmable) processing circuitry configured to operate in the manner described, while other elements of the apparatus of the technology described herein are in the form of programmable processing circuitry that is programmed to operate in the manner described.

Some embodiments of the data processing system, graphics processing system, data processors, graphics processors, processing circuitry, apparatus, etc., may be in communication with memory and/or more memory devices that store the data described herein, such as the data for the texture(s), the page table(s) for the texture(s), the results of the texturing operations, etc., and/or that store software for performing the processes described herein. The data processing system, graphics processing system, data processors, graphics processors, processing circuitry, apparatus, etc., may also be in communication with a display for displaying images based on the processed texture data.

It should also be noted here that, as will be appreciated by those skilled in the art, the various functions, etc., of the technology described herein may be duplicated and/or carried out in parallel on a given processor.

It will also be appreciated by those skilled in the art that all of the embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

FIG. 1 shows schematically an embodiment of a data processing system 1 that may be operated in the manner of the technology described herein.

As shown in FIG. 1, the data processing system 1 comprises a host system 2 and a graphics processing system 3 that is in communication with the host system 1. FIG. 1 shows the main elements of the data processing system 1, the host system 2, and the graphics processing system 3 that are relevant to the operation of the present embodiment. As will be appreciated by those skilled in the art, there may be other elements of the data processing system 1, host system 2 and graphics processing system 3 that are not illustrated in FIG. 1.

As shown in FIG. 1, the host system 2 includes, inter alia, a host processor (CPU) 4 and a storage medium 5. The CPU 4 is operable to execute applications that may require graphics processing operations to be performed by the graphics processing system 2. The storage medium 5 may, e.g., be a disk drive or other storage medium (e.g. a hard disk, a RAID array of hard disks or a solid state disk) of or accessible to the host system 2, and may be an internal storage medium of the host system 2, or an external or removable storage medium.

The graphics processing system 2 includes, inter alia, a graphics processing unit (GPU) 6 and a local memory 7. The local memory 7 may, e.g., comprise a RAM that is associated with the graphics processing unit 6, such as a cache memory accessible to the graphics processing unit 6. In the present embodiment the local memory 7 is DDR memory. Other arrangements would, of course, be possible. The local memory 7 may be memory that is private to the GPU 6, or it may be memory that is shared with the host CPU 4, if desired.

In this embodiment, the graphics processing unit (graphics processor) 6 is a tile-based rendering processor. However, other arrangements are, of course, possible.

As shown in FIG. 1, the graphics processing unit 6 includes a state management system 8, a rasterising stage 9, a rendering stage 10 in the form of a rendering pipeline, and a set of tile buffers 11. It will be appreciated that each of the stages, elements, and units, etc., of the graphics processor 6 as shown in FIG. 1 may be implemented as desired and will accordingly comprise, e.g., appropriate circuitry, and/or processing logic, etc., for performing the necessary operation and functions. They may also share processing circuitry if desired.

The state management system 8 stores and controls state data and the state of the graphics processing unit 6 to control the graphics processing operation, as is known in the art.

The rasteriser 9 takes as its input primitives to be used to generate a rendering output, such as a frame to be displayed, and rasterises those primitives to sampling positions and generates fragments to be rendered, as is known in the art.

The rendering pipeline 10 takes fragments from the rasteriser 9 and renders those fragments to generate output fragment data, e.g. for display. As is known in the art, the rendering pipeline 10 will include a number of different processing units, such as fragment shaders, blenders, texture mappers, etc.

The output from the rendering pipeline 10 (the rendered fragments) is output to tile buffers 11 (since the present embodiment is a tile-based system). The tile buffers' 11 content is then finally exported to an output buffer, such as a frame buffer 12 of a display for display. (Although the frame buffer 12 is shown schematically as a separate buffer in FIG. 1 for illustration purposes, as will be appreciated by those skilled in the art, the frame buffer 12 may typically also be stored in the local memory 7 of the graphics processing system 3.)

As shown in FIG. 1, the rendering pipeline 10 includes a texture mapping stage (a texturing unit) 13 configured to fetch relevant texture data from memory and used the fetched texture data to generate texturing output data to, e.g., be used to process (to be applied to) a fragment that is being rendered.

When the texturing unit 13 needs a given texel or texels for applying to a fragment being rendered, it will determine the texture map and encoded block within that map that it needs for the texel in question (e.g. based on the position of the texel, as is known in the art), retrieve the relevant texture data from memory and then determine the texel's value (e.g. colors) appropriately.

The texture mapper 13 includes suitable processing circuitry to do this. This processing circuitry may, e.g., be in the form of a dedicated hardware element that is configured appropriately, or it may, e.g., comprise programmable processing circuitry that has been programmed appropriately. In an embodiment a dedicated hardware texturing unit is used.

The texturing unit 13 is configured to be able to perform virtual texturing in the manner of the technology described herein. Its operation in this regard will be described in more detail below.

As discussed above, the present embodiment is directed to the operation of the graphics processing system 3 when performing so-called virtual texturing. To this end, the storage medium 5 of the host system 2 will store one or more "large" textures (essentially textures to be used by the graphics processing system 3 that are too large for it to be practicable to load them in their entirety into the local memory 7 of the graphics processing system 3 when they are to be used).

In accordance with virtual texturing principles, each such "large" texture that is stored in the storage medium 5 is accordingly divided into respective memory pages, which pages can then be loaded by the CPU 4 of the host system 2 into the local memory 7 of the graphics processing system 3 for use. As shown in FIG. 1, a portion 14 of the local memory 7 of the graphics processing system 3 is set aside for the purpose of storing texture pages that have been loaded from the storage medium 5. (As discussed above, the loading of the texture pages into the local memory of the graphics processing system could comprise, e.g., simply copying the pages from where they are externally stored into the local memory of the graphics processing system, or transforming or otherwise processing pages of texture data stored externally to the graphics processing system to generate the texture pages that are then loaded into the local memory of the graphics processing system for use by the graphics processing system, or executing some function or routine to generate the texture pages that are loaded into the local memory of the graphics processing system for use by the graphics processing system.)

FIG. 2 illustrates the concept and arrangement of virtual texturing. FIG. 2A shows an example texture 20 having multiple mipmap levels. FIG. 2B shows the lowest (most detailed) mipmap level 21 divided into plural pages 22 for the purpose of virtual texturing. The higher (less detailed) mipmap levels are correspondingly divided into pages (not shown).

Figure 2A:
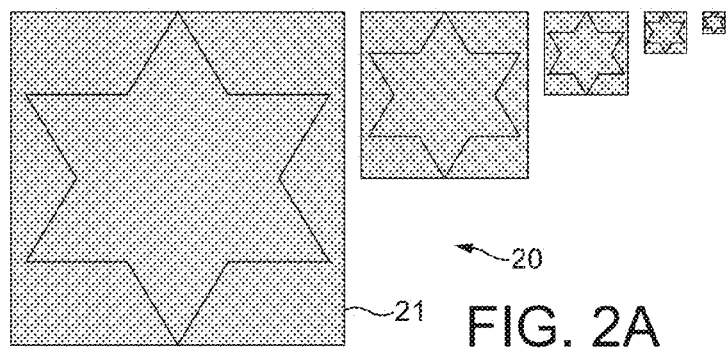
FIGS. 2A, 2B, 2C, and 2D illustrate the arrangement and concept of virtual texturing.
Figure 2B:
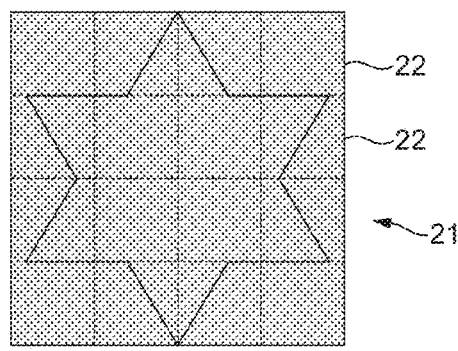
Figure 2C:
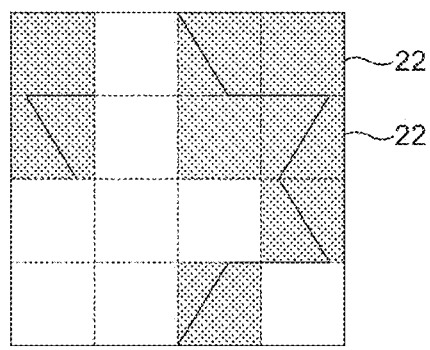

FIG. 2C shows schematically the storing of some but not all of the pages 22 of the lowest mipmap level 21 of the large texture 20 of FIG. 2A in the local memory 7 of the graphics processing system 3. As can be seen from FIG. 2C, some but not all of the pages 22 of the mipmap level 21 are present in the local memory 7.

Figure 2D:
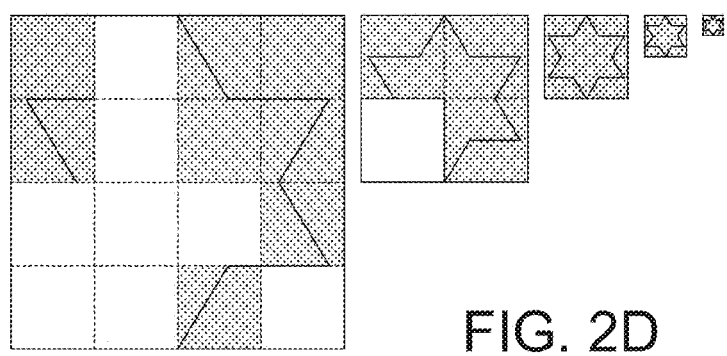

FIG. 2D correspondingly shows the storing of the various mipmap levels of the texture 20 of FIG. 2A in the local memory 7 of the graphics processing system 3. Again, for the more detailed mipmap levels only some of the pages of the overall large texture map 20 are present in the local memory (although the smallest (least detailed) mipmaps are fully present in the local memory 7).

As shown in FIG. 1, for each texture stored in the host storage medium 5 for which pages can be loaded into the local memory 7 of the graphics processing system 3, a page table 15 is stored in the local memory 7 of the graphics processing system 3.

Thus, each texture map that is stored in the storage medium 5 is subdivided into fixed-size pages for the purposes of loading it into the local memory 7 of the graphics processing system 3, and has a page table that maps each page of the texture to a given memory region.

The page tables 15 include the following entries for each page of a texture: a page address (in the case of a page that is resident in the local memory 7) or mipmap skip (for a page that is not currently resident in the local memory 7 of the graphics processing system 3) entry 31; a fade factor field 32 (which is unused in the case of a page that is not resident in the local memory 7 of the graphics processing system 3); a recently accessed bit 33; and a valid bit 34 that is used to indicate whether the page is currently stored in the local memory 7 of the graphics processing system 3 or not.

The purpose of these fields and parameters will be discussed in more detail below.

FIG. 3 illustrates this. FIG. 3A shows an example of a generic page table entry format 30, comprising a page address/mipmap skip field 31, a fade factor field 32, an accessed bit 33 and a valid bit 34.

FIG. 3B shows the respective uses of these fields for a page that is not stored in the local memory 7 of the graphics processing system 3 (for an invalid page table entry). In this case, the page address/mipmap skip field 31 has a mipmap skip index, the fade factor field 32 is unused, the accessed bit 33 is available for use, and the valid bit 34 is set to 0 to indicate that the page is not currently stored in the local memory 7 of the graphics processing system 3.

FIG. 3C shows the corresponding page table entry for a page that is loaded in the local memory 7 of the graphics processing system 3 (i.e. for a valid page table entry). In this case, the page address/mipmap skip field 31 contains a page address indicating where the page is stored in the local memory 7, the fade factor field 32 will include a fade factor value, the accessed bit 33 is present and can be set (this will be discussed further below), and the valid bit 34 is set to 1 to indicate that the page is present in the local memory 7 of the graphics processing system 3.

The page address 31 indicates the address in the local memory 7 where the page is stored. The valid bit 34 is used to indicate whether the page is currently stored in the local memory 7 of the graphics processing system 3 or not.

The accessed-bit 33 is used to track, for each page, whether it has been accessed recently. When a texture access is attempted to a page that does not have the accessed-bit set, then the accessed-bit for the page is set (this is done regardless of whether the page is valid (present in the local memory 7) or not).

The host system 2 (e.g. the driver or application) is configured to perform a sweep through the page table at regular intervals, recording which pages were accessed (have their accessed bits 33 set) and then clearing the accessed-bits. Such a sweep allows the host (e.g. application) to determine which pages have been in recent use and which have not, thereby enabling the host (e.g. application) to make an informed decision on which pages to evict from the local memory 7 of the graphics processing system 3.

The fade-factor 32 is a number from 0 to 1 that is stored on a per-page basis and that can be set for pages that are resident in the local memory 7 of the graphics processing system 3. In the present embodiment, the role of the fade factor 32 is to act as a limit on the contribution that a given page can make to the final result of texturing. In a mipmap pyramid, pages are tracked separately for each mipmap level and if a page has a fade factor of N that is less than 1, then the remainder of the contribution is taken from the next mipmap level.

The fade factor 32 is exposed to applications that are using the graphics processing system 3, and the actual setting and manipulation of fade factors to achieve fade-in and fade-out is under the control of the application (the application's responsibility).

In the present embodiment, the fade factor for a page is set to a value close to 0 when the page is just loaded into the local memory 7 of the graphics processing system 3, and then gradually increased one frame after another until the fade factor reaches 1. This causes the page to be gradually faded in, resulting in a much more visually pleasing appearance than what would be the case if the page was just swapped in and displayed in full immediately (this could cause a rather distracting popping effect). The fade-factor is also correspondingly used to fade out pages that the application wishes to swap out, so that those pages don't abruptly pop out of existence.

FIG. 7 illustrates this use and operation of the fade factor. FIG. 7 shows the sequence of images that will be displayed in successive frames as a higher resolution mipmap level of a texture to be used is loaded into the local memory 7 of the graphics processing system 3 and its fade factor is progressively increased so as to gradually increase its contribution to the output image over time (so as to "fade in" the higher resolution mipmap level in a smoother manner than simply "swapping it in" immediately).

Figure 7A:
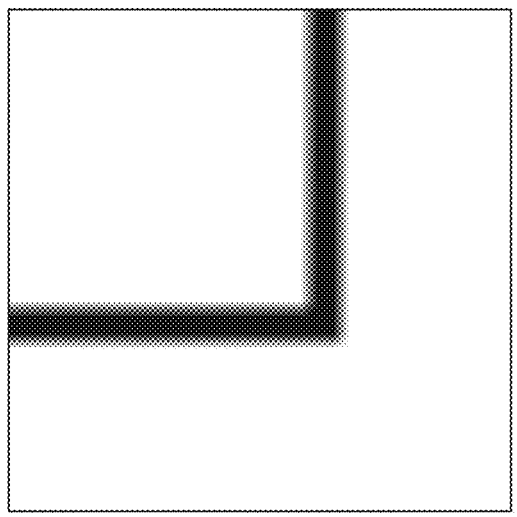
FIGS. 7A, 7B, 7C, 7D and 7E illustrate the use and operation of the fade factor in the described embodiment of the technology described herein.

FIG. 7A shows the situation where it is assumed that the desired higher resolution mipmap page is not present in the local memory 7 and so a (scaled up) lower resolution mipmap level is displayed instead while the higher resolution mipmap level is loaded into the local memory 7 of the graphics processing system 3.

Figure 7B:
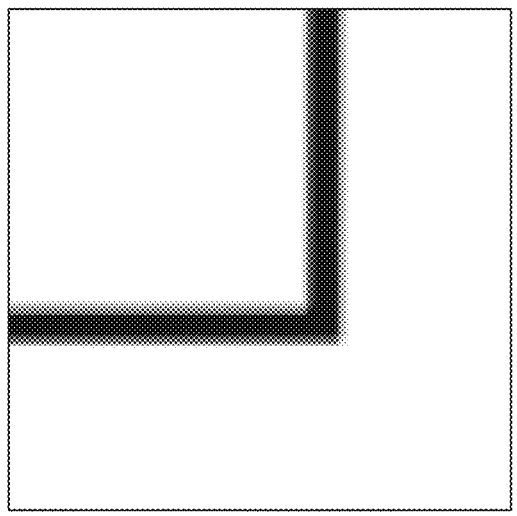

FIG. 7B then shows the situation where the higher resolution mipmap level has been loaded into the local memory 6 but has a 25% fade factor applied to it to allow for the fact that it is newly loaded into the local memory 7 of the graphics processing system 3. Thus FIG. 7B shows the combination of the lower resolution mipmap level and the higher resolution mipmap level with a 25% fade factor applied to the higher resolution mipmap level.

Figure 7C:
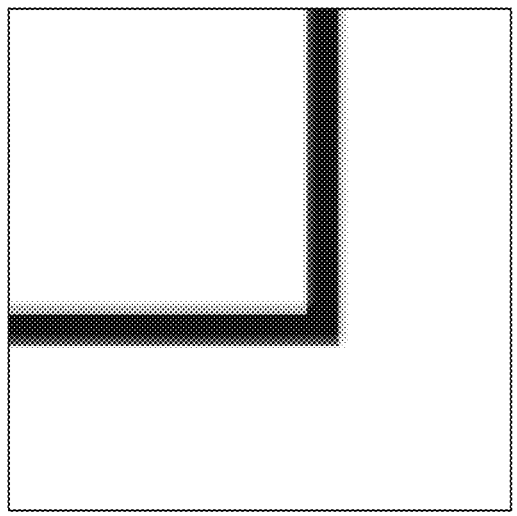

FIG. 7C then shows the image in the next frame where the fade factor for the higher resolution mipmap level has been increased to 50%. Thus FIG. 7C shows the filtered combination of the lower resolution mipmap level image and the higher resolution mipmap level image with a 50% fade factor applied to the higher resolution mipmap level.

Figure 7D:
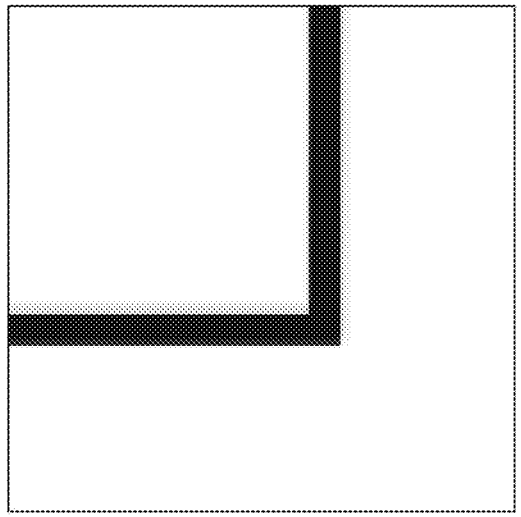

FIG. 7D shows the image in the next frame where the fade factor for the higher resolution mipmap level has been increased to 75%. Thus FIG. 7D shows a filtered output image derived from the lower resolution mipmap level and the higher resolution mipmap level with a 75% fade factor applied to the higher resolution mipmap level.

Figure 7E:
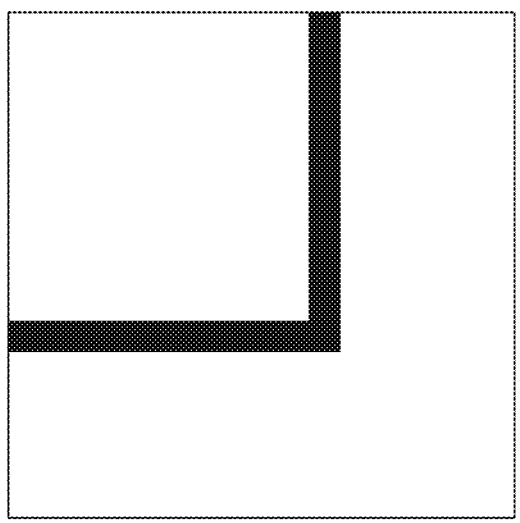

FIG. 7E then shows the higher resolution image for the next frame which is formed using the higher resolution mipmap level only (as the fade factor for the higher resolution mipmap level will now be 100%).

As discussed above, when performing virtual texturing a page miss (a page fault) can be encountered, when the texture page needed for a texture look-up is not stored in the local memory 7 of the graphics processing system 3.

In the present embodiment, the mechanism for detecting a page fault (a missing page) is not shader based; instead, it runs as part of the fixed-function texture lookup operation. This means that no shader instructions have to be executed to detect page faults. Also, as the page table 15 is likely to be cached in a TLB, where the page fault check can be done at page load time, the page fault check can thus be amortized over a large number of texture lookups to save power.

As discussed above, each page has a valid-bit 34 and an accessed bit 33. When a texture access is attempted to a page that has neither the valid-bit nor the accessed bit set, then a page fault is recorded and the page is added to a page fault list (a "missing pages" list) 16 in the local memory 7. The mechanism for detecting and recording page faults is transparent to the shader and does not stall the rendering process. This means that page fault handling can be done in a batched manner, asynchronously to the actual rendering process.

In the present embodiment, in the case of a page fault being detected, one of the running shader threads is interrupted to run an exception handler that then performs an atomic test-and-set operation on the accessed bit 33 and if it flipped the bit from 0 to 1, appends the page fault to the page-fault list 16. Other arrangements, such as having a dedicated hardware block or separate processing unit that will perform the same action as such an exception handler, or either of the above, but with non-atomic update (although in this case, a page fault could end up getting recorded multiple times such that duplicates may then have to be filtered out), would be possible, if desired.

This mechanism produces a list 16 of page faults that the host system (e.g. the application) can then query and handle at its convenience. Batching up page faults in this manner also enables the underlying storage medium 5 holding the nonresident pages to optimize the page accesses by reordering, pipelining or any other optimizations to maximize the rate at which missing pages can be loaded.

In operation of this described embodiment of the technology described herein, the host system 2 would, for example, initially load a minimal set of texture pages from the external memory 5 into the local memory 7 of the graphics processing system 3, and set up the texture page mapping for all the texture pages. The graphics processing unit 6 would then set the accessed bits when trying to access the texture in the local memory 7 and the host 2 would then analyse this information and set fade factors, load additional texture pages, and unload unused texture pages, etc., as the texturing operation proceeds.

Figure 4:
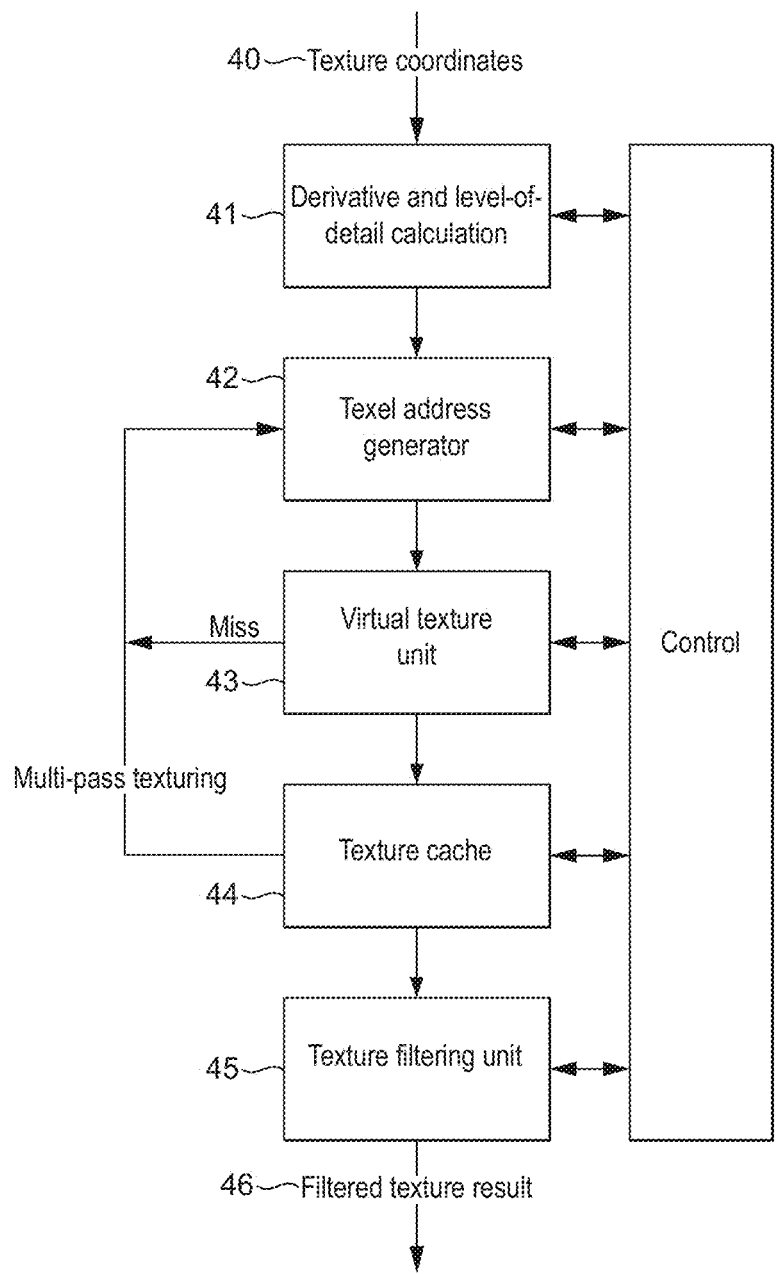
FIG. 4 shows schematically the texturing unit of the described embodiment of the technology described herein in more detail.

FIG. 4 shows the texturing unit 13 (the texturing subsystem) of the graphics processing unit 6 in the present embodiment in more detail.

As shown in FIG. 4, the texture processing unit 13 receives as an input texture coordinates 40 for texture values to be used to generate a texturing result. There is then a derivative and level of detail calculation unit 41 which carries out, as is known in the art, any necessary derivative and level of detail calculations required for the texturing operation. A texel address generator 42 then generates the texel addresses to be looked up (for which texture data is to be retrieved) from the texture in question.

A virtual texture unit 43 then uses the texel addresses to retrieve texture values from texture pages that are stored in the local memory 7 of the graphics processing system 3 and stores those texture values in a texture cache 44. The operation of this virtual texturing unit 43 will be described in more detail below.

As discussed above, and as shown in FIG. 4, it is possible for the virtual texture unit to encounter a page miss (a page fault) when it attempts to look up texture data required for a virtual texture, because the relevant texture page is not stored (is not available) in the local memory 7 of the graphics processing system 3. To take account of this, as shown in FIG. 4, the virtual texture unit 43 is configured to repeat the texture lookup operation in the event that it encounters a page miss.

If multi-pass texturing is being performed, the texturing process then returns to the texel address generator 42 for the next texture pass and so on, until all the required texture values are stored in the texture cache 44.

A texture filtering unit 45 then takes the values stored in the texture cache 44, performs any required filtering of or with those values to generate the output filtered texture result 46, which can then be used by the renderer 10 as required, e.g. to generate appropriate textured fragment and/or sampling point data for use to generate a desired render output.

Figure 5:
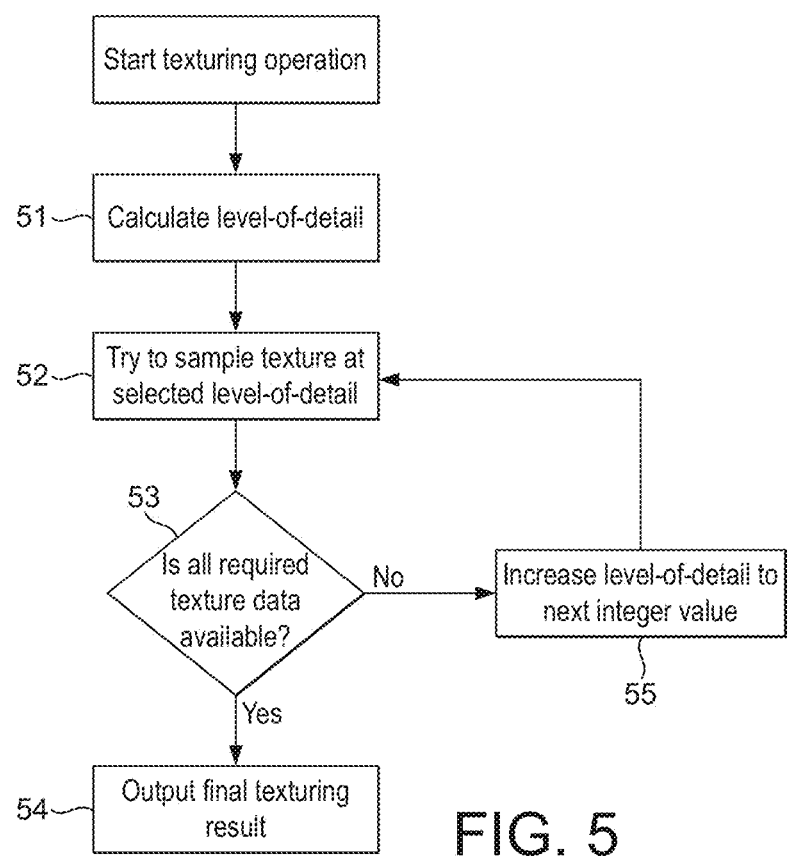
FIGS. 5 and 6 show schematically the operation of the texturing unit of the graphics processing system when performing virtual texturing in an embodiment of the technology described herein.
Figure 6:
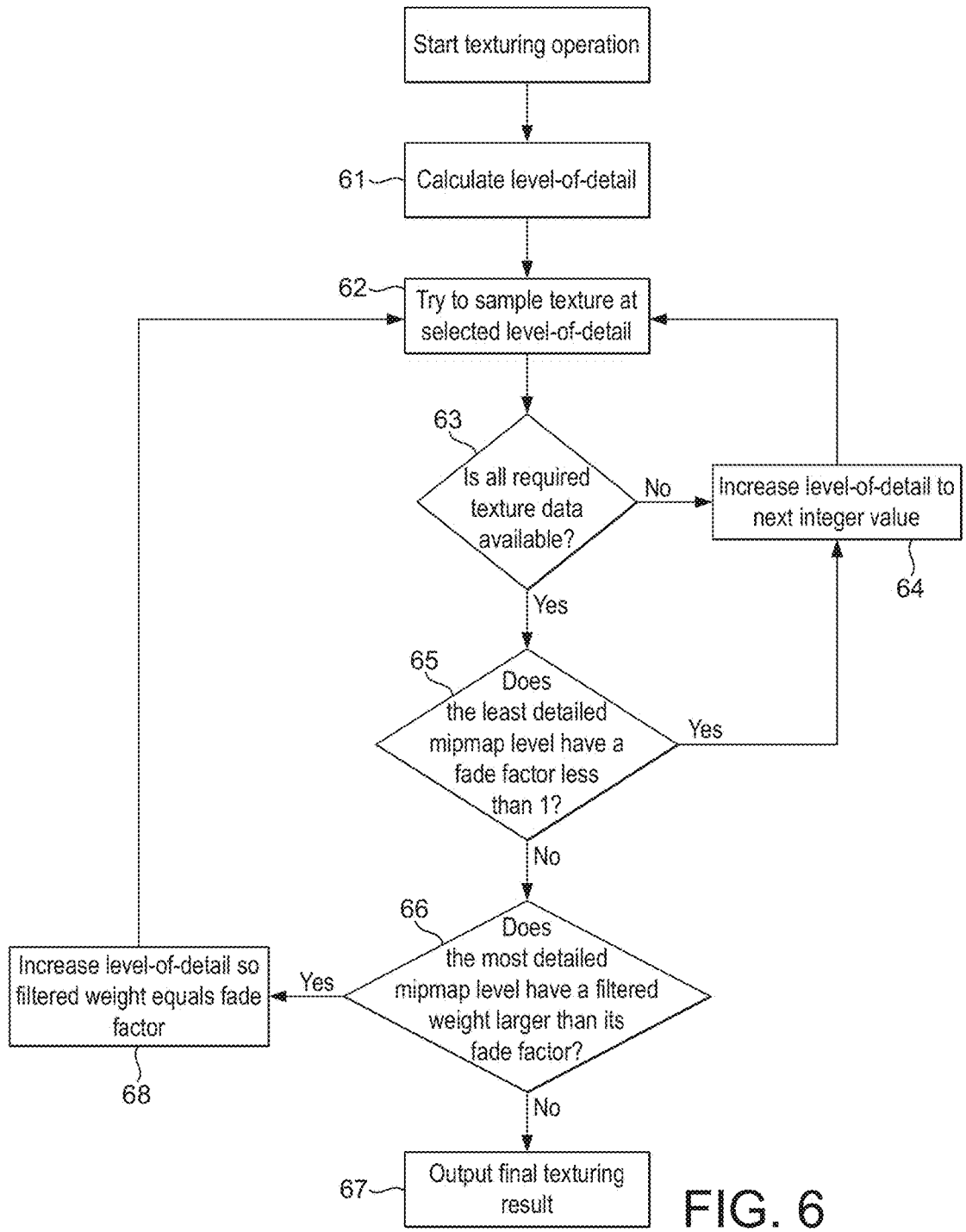

The operation of the texturing unit 13 is shown in more detail in FIGS. 5 and 6. FIG. 5 shows for illustration purposes the operation where it is assumed that fade factors are not being used. FIG. 6 shows an arrangement of the operation in the present embodiment that takes account of any fade factors that may be set for the texture pages in question.

In the arrangement shown in FIG. 5, the texturing operation comprises, once the initial level of detail that is required for the texturing operation has been calculated (step 51) (this will be done by the texel address generator 42), the virtual texturing unit 43 then trying to sample the texture in the local memory 7 of the graphics processing system 3 at that selected level of detail (step 52). If all the required texture data for that selected level of detail is available (i.e. the relevant pages of the texture are stored in the local memory 7 of the graphics processing system 3) (step 53), then the process proceeds to generate and output the final texturing result (step 54) (using the texture filtering unit 45).

On the other hand, if all the required texture data at the selected level of detail is not available in the local memory 7 of the graphics processing system 3 (i.e. a page miss occurs), then the virtual texturing unit operates to increase the level of detail to the next integer value (step 55), and the process then loops back through the texel address generator 42 and virtual texturing unit 43 to try to sample the texture at that increased level of detail (step 52), and so on, until the required texture data is found in the local memory 7 of the graphics processing system 3.

In this way, if the texture page that is required for performing the texturing operation using the originally desired level of detail is not present in the local memory 7 of the graphics processing system 3, the virtual texture lookup process will effectively operate to use instead texture data for the texel positions in question from a higher level (i.e. less detailed) mipmap. This then allows the texturing operation to proceed, using the best approximation to the originally desired texture data that is available in the local memory 7 of the graphics processing system 3.

FIG. 6 shows an exemplary operation of the texturing unit 13 in the present embodiment where texture pages stored in the local memory 7 of the graphics processing system 3 have fade factors (as discussed above) associated with them.

As shown in FIG. 6, the texturing operation in this situation again comprises, once the initial level of detail that is required for the texturing operation has been calculated (step 61), then trying to sample the texture at that selected level of detail (step 62).

Again, if all the required texture data at the selected level of detail is not available in the local memory 7 of the graphics processing system 3 (i.e. a page miss occurs) (step 63), then the texturing unit operates to increase the level of detail to the next integer value (step 64), and then tries to sample the texture at that increased level of detail (step 62), and so on, until the required texture data is found.

As shown in FIG. 6, once it is found that all the required texture data at the level of detail in question is available in the local memory 7 of the graphics processing system 3 (at step 63), it is then determined whether the least detailed mipmap level to be used has a fade factor of less than one (i.e. is still being faded in) (step 65). If this is the case, the texture lookup operation operates to increase the level of detail to the next integer value (step 64) and then tries to sample the texture at that level of detail (step 62) and determines if all the required texture data is available (step 63), and so on. This ensures that the least detailed mipmap level to be used to generate a texturing result is always fully "faded in".

As further shown in FIG. 6, once it is found that the least detailed mipmap level is fully faded in (i.e. has a fade factor of 1) (step 65), it is then further checked whether the most detailed mipmap level will have a filtered weight in the texture filtering process that is larger than its fade factor (step 66). If it doesn't, the sampled texture data is used to generate the final texturing result (step 67). On the other hand, if the most detailed mipmap level has a filtered weight larger than its fade factor, then the texturing process operates to increase the level of detail so the filtered weight equals the fade factor (step 68), and then again attempts to sample the texture at that selected level of detail (step 62), and the texturing process is then repeated. This has the effect that the most detailed mipmap level to be used to generate a texturing result will never have a filtered weight that is larger than its fade factor.

By way of example, in the situation where the most detailed mipmap level to be used for a texturing operation has a fade factor of 0.3, and the next lower detailed mipmap level has a fade factor 0.4 (such that together these two mipmap levels can only contribute a total of 0.7 to a texturing result according to their fade factors and the least detailed mipmap level has a fade factor of less than 1), the above process will operate to firstly reset the level of detail for the texturing operation to point at the level of detail integer value indicating the mipmap level having the fade factor of 0.4 (by virtue of the operation of steps 65 and 64). As this mipmap level has a fade factor of 0.4, the next lower mipmap level will also be required to contribute to the texturing result. If it is assumed that this next lower detailed mipmap level is present in the local memory 7 and has fully faded in (has a fade factor of 1.0), then the tests at steps 63 and 65 will be passed, and so the texturing operation will proceed to step 66.

Steps 66 and 68 will then operate to adjust the level of detail to a non-integer value such that the texturing output is generated using a filtered sum that adds up to 1.0, namely 0.4 from the mipmap level with the fade factor of 0.4 and 0.6 from the next lower detailed mipmap level.

It will be appreciated from the above that in the present embodiment the texture lookup procedure that will be run when a texture access is made to a part of the texture map that is not actually present in the local memory 7 of the graphics processing system 3, i.e. where a texture access is attempted to an invalid page (that is, a page with its valid-bit set to 0), is as follows:

Let M be a mipmap level parameter.
1. First, compute M as normally for a mipmapped texture lookup (if the texture lookup corresponds to the bottom/largest mipmap, then M=0, if the lookup corresponds to the next mipmap, then M=1, if the lookup corresponds to a detail level mid-way between the two largest mipmaps, then M=0.5 and so on)
2. Perform a fully filtered texture lookup, using M to select which mipmaps to filter between and the weight assigned to each.
3. If any of the texels going into the filtering are taken from a page with valid-bit=0, then increase M to the next integer value, then go back to step 2, fully restarting the filtered texture lookup.
4. If M is a non-integer value, with fractional part F, then the weight assigned to the larger mipmap is 1−F. If this weight is larger than the fade factor X for any of the accessed pages in the larger mipmap, then increase M to floor(M)+1−X. Then go back to step 2, fully restarting the filtered texture lookup.
5. If M is a non-integer value, and any of the accessed pages in the smaller mipmap has a fade factor less than 1, then increase M to the next integer value. Then go back to step 2, fully restarting the filtered texture lookup.

This procedure basically walks up the mipmap pyramid until texture data is found in the local memory 7 of the graphics processing system 3. For a texture lookup that hits a missing page, this procedure will give the best approximation available to the "correct" texture result given the texture data that is actually present in the local memory 7 of the graphics processing system 3.

As this procedure is a built-in function of the texturing hardware, the shaders do not, in the common case, need to concern themselves with whether the texture lookup has a page fault or not.

In the case where texture data is missing at multiple levels in the mipmap pyramid, then the procedure described above could be relatively slow. To mitigate this, as discussed above a mipmap skip index can be stored for each invalid page in the page table 15 (i.e. for each page that is not resident in the local memory 7 of the graphics processing system 3), to indicate what may be the next mipmap level for which valid data for the given texture location is stored in the local memory 7 of the graphics processing system 3. In this case, step 3 in the procedure above will be modified: instead of just trying the next mipmap level up, the mipmap skip (next-valid-mipmap) information from the page table should be used to skip (potentially) multiple mipmap levels before going back to step 2.

Since this mipmap skip information is useful only for invalid pages, it can reuse page-table-entry bits that are otherwise useful only for valid pages, such as the address bits or the fade-factor bits.

As will be appreciated by those skilled in the art, various alterations, modifications and additions, etc., to the described embodiments of the technology described herein would be possible, if desired.

For example, it is possible to augment the accessed-bit with an accessed-counter, that counts the actual number of attempted accesses to a texture page. This can be used to track the pages' access frequency in more detail, in order to further inform paging decisions. If managing such a per-page counter is likely to be quite expensive, sparse counting, where a pseudo-random number is generated for every texture lookup and used to perform a counter increment with a fixed small probability could be used as a less expensive variation of full counting, if desired (a probability of e.g. 1:100 would reduce counter activity by a factor of 100 while still being likely to track a useful amount of information about texture usage).

Similarly, in the case of the texturing operation where texture pages stored in the local memory 7 of the graphics processing system can have fade factors associated with them, then various alternatives to the operation described above with reference to FIG. 6 would be possible.

For example, rather than adjusting the level of detail to be higher in the mipmap pyramid when the least detailed mipmap level has a fade factor less than one and/or the most detailed mipmap level has a filtered weight larger than its fade factor, the initial mipmap levels could instead be used at the weights corresponding to their assigned fade factors, with any further texture data required to give a filtered sum that adds up to 1.0 then being taken from an available higher (less detailed) mipmap level. Thus, in the case of the example given above for example, the texture data could be generated by sampling over three mipmap levels, with weights 0.3 and 0.4 for the original mipmap levels (corresponding to their fade factors), respectively, and a weight of 0.3 for the next lower detailed mipmap level so as to sum to a total filtered weight of 1.0. This may provide a smoother fading result.

It would also be possible to filter between two mipmap levels by using the sum of the fractional fade factors to adjust the level of detail to determine what weighting point to filter at between the two mipmap levels. For example, if the fade factors for the two adjacent mipmap levels are 0.3 and 0.7, and the required level of detail is 0.5 for the most detailed mipmap level, the level of detail could instead be adjusted to sample at 0.3/0.7 instead of 0.5/0.5 thereby allowing the filtering to proceed with the initial mipmap levels but without the weighted contribution according to the level of detail exceeding the respective fade factors set for the mipmap levels in question. If necessary, the process could first move up a mipmap level (or levels), if the sum of the two adjacent mipmap levels doesn't equal or exceed 1.0.

In general, any process that identifies and uses a sampling point in the mipmap pyramid where the sum of the filtered weights equals 1.0 without the individual filtered weights exceeding the corresponding fade factors that have been set for the respective regions of the respective mipmap levels in question can be used. In an embodiment a process that identifies and uses the closest point (or an approximation to the closest point) in the mipmap pyramid where the sum of the filtered weights equals 1.0 without the individual filtered weights exceeding the corresponding fade factors that have been set for the respective regions of the respective mipmap levels in question is used.

It would also be possible to use the sum of the fade factors associated with plural mipmap levels to limit the level of detail used for a texture lookup, rather than using the fade factors for individual mipmap levels to limit the contribution from the mipmap levels individually. In this case the fade factors for some or all of the mipmap levels could be summed and that fade factor sum then used as the maximum level of detail for the texture lookup process, even if a higher level of detail was requested (desired).

For example, considering an arrangement where the mipmap pyramid for a texture has five levels, with the highest (least detailed) mipmap level being level 0 and assumed to be always present in the local memory of the graphics processing system and set so it cannot be faded (such that it has no fade factor associated with it), and the other mipmap levels 1 to 4 (in increasing order of detail) being able to be loaded into the local memory of the graphics processing system and each having associated fade factors for respective sub-regions (e.g. pages) within the mipmap level, then the fade factor level of detail limit for a given set of texture positions would be the sum of the fade factors from level 1 down to, and including, level 4 of the mipmap pyramid for the mipmap level sub-regions covering the texture positions in question.

In this case, assuming, by way of example, that the texture lookup process requests a level of detail (LOD) of 3.5, then for the fade factors for each mipmap level shown in the table below, the actual level of detail to be used for the texture lookup process will be the "result" level of detail shown in the table:

| Mipmap Level | fade factor | | | | | |
|---|---|---|---|---|---|---|
| 0: | <always present - no factor> | | | | | |
| 1: | 1.0 | 1.0 | 1.0 | 1.0 | 1.0 | 1.0 |
| 2: | 1.0 | 1.0 | 1.0 | 1.0 | 1.0 | 1.0 |
| 3: | 0.0 | 0.1 | 0.4 | 0.8 | 0.9 | 1.0 |
| 4: | 0.0 | 0.0 | 0.3 | 0.7 | 0.8 | 1.0 |
| Fade Factor Sum: | 2.0 | 2.1 | 2.7 | 3.5 | 3.7 | 4.0 |
| Requested LOD: | 3.5 | 3.5 | 3.5 | 3.5 | 3.5 | 3.5 |
| Result LOD: | 2.0 | 2.1 | 2.7 | 3.5 | 3.5 | 3.5 |

As can be seen, where the sum of the fade factors is less than the requested level of detail, the level of detail that is used for the texture lookup process is set to the sum of the fade factors instead. This has the effect of progressively increasing the level of detail that is used towards the desired level of detail as the more detailed mipmap levels progressively "fade in" to the local memory of the graphics processing system. This arrangement can give "pop-less" fading, regardless of the individual fade factors (and so is good for orthogonal scaling, for example).

This method thus uses the fade factors to modify (and manipulate) the level of detail seen from the sampling point across the whole mipmap pyramid, not just the contribution of the particular mipmap levels in the mipmap associated with the particular fade factor values.

This arrangement may require the fade factors in the mipmap pyramid to be summed at runtime. Where this is not desirable, other heuristic variants that cost less, such as pre-summing fade factors for parts (or all) of the mipmap pyramid, caching fade factor sums, or limiting the traversal depth of the mipmap pyramid, could be used if desired.

Where fade factors are used, in an embodiment the fade factor for a given lower (more detailed) mipmap level is only increased from 0 once the previous higher mipmap level has fully faded in (has reached 1) when a page is fading in. Similarly, when fading out, the fade factor for the next mipmap level is in an embodiment only begun to be decreased from 1 once the previous level has completely faded out (has a fade factor of 0). This will then ensure that the texturing process never has to sample more than two mipmap levels where fade factors are being used.

Where adjacent pages of the same mipmap level have different fade factors (e.g. 0.3 and 0.4) and are covered by a single, fully faded-in page at the next higher mipmap level, then, for example, the respective individual fade factor values could be used appropriately for each respective part of the texture (such that there would be a 0.3/0.7 split for one part of the texture, and a 0.4/0.6 split for the other part of the texture, for example), or the minimum supported fade factor split could be used for both parts of the texture (such that there would be a 0.3/0.7 split for both parts of the texture, for example).

It can be seen from the above that the technology described herein, in its embodiments at least, provides a virtual texturing arrangement in which fade factors associated with respective texture pages are used to allow texture paging to be done in a more visually pleasing manner than just a binary "page-is-here"/"page-is-not-here" switch.

The foregoing detailed description has been presented for purposes of illustration and description. It is not intended to be exhaustive or to limit the technology described herein to the precise form disclosed. Many modifications and variations are possible in light of the above teaching. The described embodiments were chosen in order to best explain the principles of the technology described herein and its practical application to thereby enable others skilled in the art to best utilize the technology described herein in various embodiments and with various modifications as are suited to the particular use contemplated. It is intended that the scope of the technology described herein be defined by the claims appended hereto.

What is claimed is:

1. A method of using a texture in a graphics processing system in which textures to be used by the graphics processing system can be stored externally to the graphics processing system and pages of the textures then loaded into a local memory of the graphics processing system for use by the graphics processing system to generate texturing result data, the method comprising:
    storing by processing circuitry respective page table entries in a page table for respective pages of a graphics texture for use by the graphics processing system to generate texturing result data that have been loaded into a local memory of the graphics processing system;
    storing by the processing circuitry in the respective page table entries for respective pages of the graphics texture that have been loaded into the local memory of the graphics processing system for use by the graphics processing system, respective fade factor values, wherein the respective texture pages comprise respective texture data for generating texturing result data, the respective fade factor values are settable by an application that uses the texture, and each fade factor value controls the contribution that texture data from the texture page for which the fade factor value is stored makes to any texturing result data that is generated by the graphics processing system using the texture data of the texture page for which the fade factor value is stored; and
    generating texturing result data by a graphics processing pipeline of the graphics processing system using texture data from a texture page that has stored fade factor value, including controlling the contribution of texture data from that texture page to the generated texturing result data in accordance with the fade factor value stored in the page table entry for that texture page.

2. The method of claim 1, wherein the step of: storing in the page table entries for respective pages within a graphics texture respective fade factor values that are settable by an application that uses the texture and that control the contribution that texture data from a texture page makes to any texturing result data that is generated using the texture data of the texture page for which the fade factor value is stored comprises:
    storing in the page table entries for respective pages within a given mipmap level of the graphics texture respective fade factor values that are settable by an application that uses the texture and that control the contribution that texture data from the texture page makes to any texturing result data that is generated using the texture data of the mipmap level page for which the fade factor value is stored.

3. The method of claim 1, wherein the texturing operation is configured to ensure that a weight used for a given page of a mipmap level in the texturing output result does not exceed the fade factor that is stored for the page of the mipmap level.

4. The method of claim 1, further comprising:
    adjusting a level of detail for the texturing operation such that the mipmaps being used to generate a texturing output result are sampled and filtered at weights that do not exceed their stored fade factors.

5. The method of claim 1, wherein:
    the texturing operation is configured to sample values from more than two mipmap levels when generating a texturing output result, in dependence on fade factor values stored for the mipmap levels.

6. The method of claim 1, wherein the texturing operation is configured such that the level of detail that is used for a given texturing operation does not exceed the sum of the fade factors of plural mipmap level pages covering the texture positions in question.

7. The method of claim 1, further comprising:
    determining whether to adjust a level of detail used for a texturing operation based on one or more fade factors stored for one or more mipmap levels of the texture.

8. The method of claim 7, further comprising at least one of: adjusting the level of detail for the texturing operation based on a fade factor stored for a given single, particular mipmap level; and adjusting the level of detail for the texturing operation based on fade factors stored for plural mipmap levels.

9. The method of claim 1, wherein the fade factor for a texture page is set to a low value when the page is initially loaded into the local memory of the graphics processing system, and then progressively increased over time while the texture page remains in the local memory of the graphics processing system.

10. A method of using a graphics texture to generate texturing result data in a graphics processing system in which textures to be used by the graphics processing system can be stored externally to the graphics processing system and pages of mipmap levels of the textures then loaded into a local memory of the graphics processing system for use by the graphics processing system to generate texturing result data, and respective page table entries for respective pages within a given mipmap level of a graphics texture that have been loaded into the local memory of the graphics processing system for use by the graphics processing system store respective fade factor values, wherein the respective mipmap level pages comprise respective texture data for generating texturing result data, the respective fade factor values are settable by an application that uses the texture, and each fade factor value controls the contribution that texture data from the mipmap level page for which the fade factor value is stored makes to any texturing result data that is generated by the graphics processing system using the texture data of that mipmap level page for which the fade factor value is stored, the method comprising:

generating texturing result data by a graphics processing pipeline of the graphics processing system using texture data from a texture mipmap level page that has a stored fade factor value, including controlling the contribution of texture data from that mipmap level page to the generated texturing result data in accordance with the fade factor value stored in the page table entry for that mipmap level page.

11. A graphics processing system in which textures to be used by the graphics processing system can be stored externally to the graphics processing system and pages of the textures then loaded into a local memory of the graphics processing system for use by the graphics processing system to generate texturing result data, comprising:

a graphics processing unit that uses graphics textures to generate texturing result data for use when generating rendering output data; and processing circuitry configured to:
store respective page table entries in a page table for respective pages of a graphics texture for use by the graphics processing system to generate texturing result data that have been loaded into a local memory of the graphics processing system;
store in respective page table entries for respective pages within a graphics texture that have been loaded into the local memory of the graphics processing system for use by the graphics processing system, respective fade factor values wherein the respective texture pages comprise respective texture data for generating texturing result data, the respective fade factor values are settable by an application that uses the texture, and each fade factor value controls the contribution that texture data from the texture page for which the fade factor value is stored makes to any texturing result data that is generated by the graphics processing unit using the texture data of that texture page for which the fade factor value is stored; and wherein:
the graphics processing unit comprises processing circuitry configured to:
generate texturing result data using texture data from a texture page that has a stored fade factor value, including controlling the contribution of texture data from that texture page to the generated texturing result data in accordance with the fade factor value stored in the page table entry for that texture page.

12. The system of claim 11, wherein:
the processing circuitry configured to store in page table entries for respective pages within a graphics texture respective fade factor values that are settable by an application that uses the texture and that control the contribution that texture data from a texture page makes to any texturing result that is generated using the texture data of the texture page for which the fade factor value is stored is configured to:
store in page table entries for respective pages within a given mipmap level of a graphics texture respective fade factor values that are settable by an application that uses the texture and that control the contribution that the pages makes to any texturing result that is generated using the texture data of the mipmap level page for which the fade factor value is stored.

13. The system of claim 11, wherein the texturing operation is configured to ensure that a weight used for a given page of a mipmap level in the texturing output result does not exceed the fade factor that is stored for the page of the mipmap level.

14. The system of claim 11, wherein the processing circuitry of the graphics processing unit is further configured to:
adjust a level of detail for the texturing operation such that the mipmaps being used to generate a texturing output result are sampled and filtered at weights that do not exceed their stored fade factors.

15. The system of claim 11, wherein:
the texturing operation is configured to sample values from more than two mipmap levels when generating a texturing output result, in dependence on fade factor values stored for the mipmap levels.

16. The system of claim 11, wherein the texturing operation is configured such that a level of detail that is used for a given texturing operation does not exceed the sum of the fade factors of plural mipmap level pages covering the texture positions in question.

17. The system of claim 11, wherein the processing circuitry of the graphics processing unit is further configured to:
determine whether to adjust the level of detail used for a texturing operation based on one or more fade factors stored for one or more mipmap levels of the texture.

18. The system of claim 17, wherein the processing circuitry of the graphics processing unit is further configured to perform at least one of: adjusting the level of detail for the texturing operation based on a fade factor stored for a given single, particular mipmap level; and adjusting the level of detail for the texturing operation based on fade factors stored for plural mipmap levels.

19. The system of claim 11, wherein the fade factor for a texture page is set to a low value when the page is initially loaded into the local memory of the graphics processing system, and then progressively increased over time while the texture page remains in the local memory of the graphics processing system.

20. A graphics processing system in which textures to be used by the graphics processing system can be stored externally to the graphics processing system and pages of mipmap levels of the textures then loaded into a local memory of the graphics processing system for use by the graphics processing system to generate texturing result data, the graphics processing system comprising:

a graphics processing unit that uses graphics textures to generate texturing result data for use when generating rendering output data; and processing circuitry configured to store in respective page table entries for respective pages within a given mipmap level of a graphics texture that have been loaded into a local memory of the graphics processing system for use by the graphics processing system, respective fade factor values, wherein the respective mipmap level pages comprise respective texture data for generating texturing result data, the respective fade factor values are settable by an application that uses the texture, and each fade factor value controls the contribution that texture data from the mipmap level page for which the fade factor value is stored makes to any texturing result data that is generated by the graphics processing unit using the texture data of that mipmap level page for which the fade factor value is stored; and wherein the graphics processing unit comprises processing circuitry configured to generate texturing result data using texture data from a texture mipmap level page that has a stored fade factor value, including controlling the contribution of texture data from that mipmap level page to the generated texturing result data in accordance with the fade factor value stored in the page table entry for that mipmap level page.

21. A data processing system comprising:

a host system;

a graphics processing system, the graphics processing system including a local memory; and a storage medium of or accessible to the host system that stores textures for use by the graphics processing system; and wherein:

the host system comprises:

a host processor that executes applications that require graphics processing operations of the graphics processing system; and processing circuitry for loading pages of textures that are stored in the storage medium of or accessible to the host system into the local memory of the graphics processing system for use by the graphics processing system to generate texturing result data; and the graphics processing system comprises:

a graphics processing unit that uses graphics textures to generate texturing result data for use when generating rendering output data; and processing circuitry configured to store in respective page table entries for respective pages of a graphics texture that have been loaded into the local memory of the graphics processing system for use by the graphics processing system, respective fade factor values, wherein the respective texture pages comprise respective texture data for generating texturing result data, the respective fade factor values are settable by an application that uses the texture, and each fade factor value controls the contribution that texture data from the texture page for which the fade factor value is stored makes to any texturing result data that is generated by the graphics processing unit using the texture data of that texture page for which the fade factor value is stored; and wherein the graphics processing unit comprises processing circuitry configured to generate texturing result data using texture data from a texture page that has a stored fade factor value, including controlling the contribution of texture data from that texture page to the generated texturing result data in accordance with the fade factor value stored in the page table entry for that texture page.

22. A non-transitory computer readable storage medium storing computer software code which when executing on a processor performs a method of using a graphics texture to generate texturing result data in a graphics processing system in which textures to be used by the graphics processing system can be stored externally to the graphics processing system and pages of the textures then loaded into a local memory of the graphics processing system for use by the graphics processing system to generate texturing result data, and respective page table entries for respective pages within a graphics texture that have been loaded into the local memory of the graphics processing system for use by the graphics processing system store respective fade factor values, wherein the respective texture pages comprise respective texture data for generating texturing result data, the respective fade factor values are settable by an application that uses the texture, and each fade factor value controls the contribution that texture data from the texture page for which the fade factor value is stored makes to any texturing result data that is generated by a graphics processing system using the texture data of that texture page for which the fade factor value is stored, the method comprising:

generating texturing result data by a graphics processing pipeline of the graphics processing system using texture data from a texture page that has stored fade factor value, including controlling the contribution of texture data from that texture page to the generated texturing result data in accordance with the fade factor value stored in the page table entry for that texture page.

\* \* \* \* \*